(12) United States Patent
Kim et al.

(10) Patent No.: US 12,223,289 B2
(45) Date of Patent: Feb. 11, 2025

(54) NEURAL NETWORK DEVICE FOR NEURAL NETWORK OPERATION, OPERATING METHOD OF THE NEURAL NETWORK DEVICE, AND APPLICATION PROCESSOR INCLUDING THE SAME

(71) Applicant: SAMSUNG ELECTRONICS CO., LTD., Suwon-si (KR)

(72) Inventors: Hyunpil Kim, Seoul (KR); Hyunwoo Sim, Seoul (KR); Seongwoo Ahn, Yongin-si (KR); Hasong Kim, Hwaseong-si (KR); Doyoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 38 days.

(21) Appl. No.: 17/212,474

(22) Filed: Mar. 25, 2021

(65) Prior Publication Data

US 2021/0311703 A1    Oct. 7, 2021

(30) Foreign Application Priority Data

Apr. 7, 2020   (KR) .................. 10-2020-0042409
Feb. 1, 2021   (KR) .................. 10-2021-0014396

(51) Int. Cl.
*G06F 7/487*    (2006.01)
*G06F 7/544*    (2006.01)

(52) U.S. Cl.
CPC .......... *G06F 7/4876* (2013.01); *G06F 7/5443* (2013.01); *G06F 2207/3824* (2013.01)

(58) Field of Classification Search
CPC ............... G06F 7/5443; G06F 7/4876; G06F 2207/3824
See application file for complete search history.

(56) References Cited

U.S. PATENT DOCUMENTS 6,480,872 B1   11/2002   Choquette
6,704,762 B1    3/2004   Inoue
(Continued)

OTHER PUBLICATIONS

N. Burgess, J. Milanovic, N. Stephens, K. Monachopoulos and D. Mansell, "Bfloat16 Processing for Neural Networks," 2019, 2019 IEEE 26th Symposium on Computer Arithmetic (ARITH), pp. 88-91. (Year: 2019).*

(Continued)

*Primary Examiner* — Matthew D Sandifer
(74) *Attorney, Agent, or Firm* — F. CHAU & ASSOCIATES, LLC

(57) ABSTRACT

A neural network device includes a calculation circuit that includes a first multiplier, a second multiplier, an align shifter, and an adder. The adder shares the first multiplier and the second multiplier. The calculation circuit performs a first dot product operation on a plurality of floating point data pairs or a second dot product operation on a plurality of integer data pairs. In the first dot product operation, the calculation circuit obtains a plurality of fraction multiplication results from the plurality of floating point data pairs, respectively, using the first multiplier, adds the plurality of fraction multiplication results using the adder and outputs first cumulative data. In the second dot product operation, the calculation circuit obtains a plurality of integer multiplication results from the plurality of integer data pairs, respectively, using the second multiplier, adds the plurality of integer multiplication results using the adder, and outputs second cumulative data.

20 Claims, 25 Drawing Sheets

(56) References Cited

U.S. PATENT DOCUMENTS

| | | | |
|---|---|---|---|
| 7,225,216 B1 | 5/2007 | Wyland | |
| 7,225,323 B2 | 5/2007 | Siu et al. | |
| 10,346,133 B1 | 7/2019 | Danysh et al. | |
| 12,079,591 B2* | 9/2024 | Kim | G06F 5/01 |
| 2019/0004769 A1 | 1/2019 | Kan et al. | |
| 2019/0294415 A1 | 9/2019 | Kaul et al. | |
| 2020/0028494 A1 | 1/2020 | Langhammer et al. | |
| 2021/0042087 A1* | 2/2021 | Pugh | G06F 13/4027 |
| 2021/0157549 A1* | 5/2021 | Elmer | G06F 7/5443 |
| 2021/0263993 A1* | 8/2021 | Urbanski | G06F 7/523 |
| 2021/0312012 A1* | 10/2021 | Kim | G06F 17/16 |

OTHER PUBLICATIONS

B. Jacob et al., "Quantization and Training of Neural Networks for Efficient Integer-Arithmetic-Only Inference," 2018, 2018 IEEE/CVF Conference on Computer Vision and Pattern Recognition, pp. 2704-2713. (Year: 2018).*
J. L. Hennessy and D. A. Patterson, Computer Architecture, Fifth Edition: A Quantitative Approach, 5th ed. San Francisco, CA, USA : Morgan Kaufmann Publishers Inc., 2012, pp. 25. (Year: 2012).*
I. Grout, 'Chapter 5—Introduction to Digital Logic Design' , in Digital Systems Design with FPGAs and CPLDs, I. Grout, Ed. Burlington: Newnes, 2008, pp. 217-331. (Year: 2008).*
I. Koren, Computer Arithmetic Algorithms, 2nd ed. Massachusetts: A K Peters, 2002, pp. viii-ix. (Year: 2002).*

* cited by examiner

Floating Point Format 1

Floating Point Format 2

Floating Point Format 3

FIG. 8A

Case1
- IN_A(FP) : | Sa | Exponent A (Ea) | Fraction A (Fa) |
- IN_B(FP) : | Sb | Exponent B (Eb) | Fraction B (Fb) |

Case2
- IN_A(FP) : | Sa | Exponent A (Ea) | Fraction A (Fa) |
- IN_B(BF) : | Sb | Exponent B (Eb) | Fraction B (Fb) |

Case3
- IN_A(BF) : | Sa | Exponent A (Ea) | Fraction A (Fa) |
- IN_B(BF) : | Sb | Exponent B (Eb) | Fraction B (Fb) |

Case4
- IN_A(INT) : | Integer A (Ia) |
- IN_B(INT) : | Integer B (Ib) |

NEURAL NETWORK DEVICE FOR NEURAL NETWORK OPERATION, OPERATING METHOD OF THE NEURAL NETWORK DEVICE, AND APPLICATION PROCESSOR INCLUDING THE SAME

CROSS-REFERENCE TO RELATED APPLICATION

This application claims priority under 35 U.S.C. § 119 from Korean Patent Application Nos. 10-2020-0042409 and 10-2021-0014396, filed on Apr. 7, 2020 and Feb. 1, 2021 in the Korean Intellectual Property Office, the contents of both of which are herein incorporated by reference in their entireties.

TECHNICAL FIELD

Embodiments of the inventive concept are directed to a neural network, and more particularly, to a calculation method and device of a neural network device that includes a calculation circuit that performs a floating point calculation and an integer calculation.

DISCUSSION OF THE RELATED ART

A neural network is a computational architecture that models a biological network of an animal brain. As neural network technology has recently been developed, there has been much research into analyzing input data and extracting valid information using a neural network device, which operates based on a neural network, in various kinds of electronic systems.

A neural network device performs a many calculations with respect to complex input data. To enable a neural network device to analyze input in real time and extract information, a technique for efficiently processing the operations of a neural network is needed. In particular, a low-power high-performance system such as a smartphone has limited resources. Therefore, a technique for reducing the number of calculations needed to process complex input data and increasing the performance of an artificial neural network is desired.

SUMMARY

Embodiments of the inventive concept provide a calculation method and device for a neural network in a neural network device that includes a calculation circuit that performs floating point calculations and integer calculations.

According to an embodiment of the inventive concept, there is provided a neural network device that includes a calculation circuit that includes a first multiplier, a second multiplier, an align shifter, and an adder. The adder shares the first multiplier and the second multiplier. The calculation circuit performs a first dot product operation on a plurality of floating point data pairs or a second dot product operation on a plurality of integer data pairs. In the first dot product operation, the calculation circuit obtains a plurality of fraction multiplication results from the plurality of floating point data pairs, respectively, using the first multiplier, performs an align shift of the plurality of fraction multiplication results based on a maximum value identified from a plurality of exponent addition results that respectively correspond to the plurality of floating point data pairs using the align shifter, adds the aligned plurality of fraction multiplication results using the adder, and outputs first cumulative data In the second dot product operation, the calculation circuit obtains a plurality of integer multiplication results from the plurality of integer data pairs, respectively, using the second multiplier, adds the plurality of integer multiplication results using the adder, and outputs second cumulative data.

According to another embodiment of the inventive concept, there is provided an method of operating a neural network device that includes receiving a plurality of data pairs; performing a floating point operation when the plurality of data pairs have a floating point format; performing an integer operation when the plurality of data pairs have an integer format; and storing final data generated through the floating point operation or the integer operation in a memory. Performing the floating point operation includes obtaining a plurality of fraction multiplication results that respectively correspond to the plurality of data pairs using a floating point multiplier and adding the plurality of fraction multiplication results using an adder to generate first cumulative data. Performing the integer operation includes obtaining a plurality of integer multiplication results that respectively correspond to the plurality of data pairs using an integer multiplier and adding the plurality of integer multiplication results using the adder to generate second cumulative data.

According to another embodiment of the inventive concept, there is provided an application processor that includes a neural network device that includes a floating point multiplier, an integer multiplier, an adder, and a memory. The neural network device performs a first dot product operation on a plurality of floating point data pairs or a second dot product operation on a plurality of integer data pairs. In the first dot product operation, the neural network device obtains a plurality of fraction multiplication results from the plurality of floating point data pairs, respectively, using the floating point multiplier, adds the plurality of fraction multiplication results using the adder to generate first cumulative data, and stores the first cumulative data in the memory. In the second dot product operation, the neural network device obtains a plurality of integer multiplication results from the plurality of integer data pairs, respectively, using the floating point multiplier and the integer multiplier, adds the plurality of integer multiplication results using the adder to generate second cumulative data, and stores the second cumulative data in the memory.

BRIEF DESCRIPTION OF THE DRAWINGS

FIG. 8A illustrates format types of data pairs input to a calculation circuit.

DETAILED DESCRIPTION

Hereinafter, embodiments will be described in detail with reference to the accompanying drawings.

Figure 1:
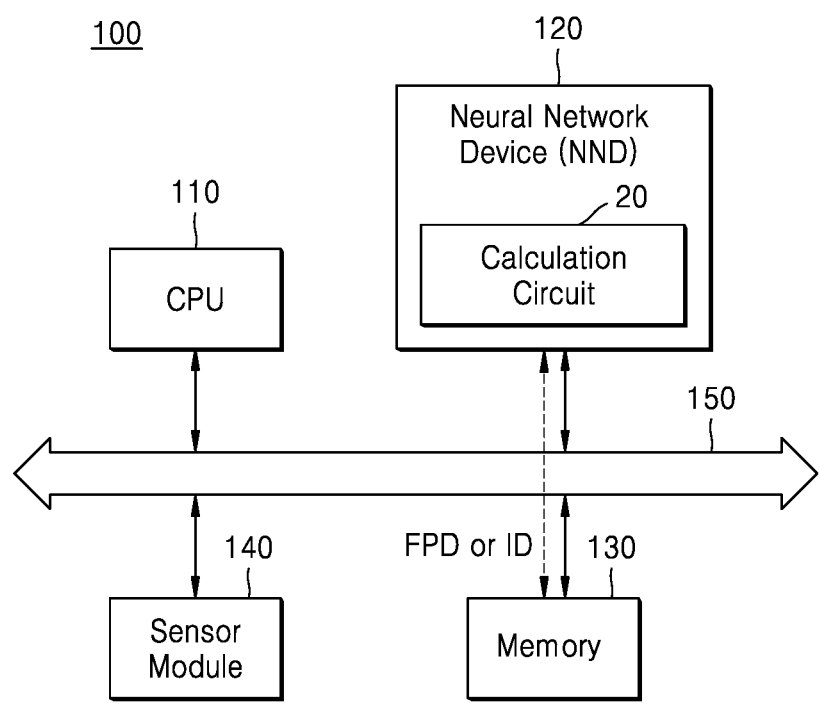
FIG. 1 is a schematic block diagram of a neural network system according to an embodiment.

FIG. 1 is a schematic block diagram of a neural network system 100 according to an embodiment.

According to an embodiment, the neural network system 100 trains a neural network or infers information from input data by analyzing the input data using the neural network. The neural network system 100 determines a situation based on the inferred information, or controls an electronic device having the neural network system 100 mounted thereon. For example, the neural network system 100 can be incorporated into a smartphone, a tablet device, a smart television (TV), an augmented reality (AR) device, an Internet of things (IoT) device, an autonomous vehicle, a robot, a medical device, a drone, an advanced drivers assistance system (ADAS), an image display device, measuring equipment, etc., which perform voice recognition, image recognition, image classification, etc., using a neural network. The neural network system 100 can be mounted on any other kind of electronic device. In an embodiment, the neural network system 100 of FIG. 1 corresponds to an application processor.

Referring to FIG. 1, in an embodiment, the neural network system 100 includes a central processing unit (CPU) 110, a neural network device 120, a memory 130, and a sensor module 140. The neural network system 100 furthers include an input/output module, a security module, a power controller, etc., and may further include various other types of processors. In some embodiments, some or all elements, such as the CPU 110, the neural network device 120, the memory 130, or the sensor module 140, of the neural network system 100 are formed in a single semiconductor chip. For example, the neural network system 100 can be implemented as a system-on-chip (SoC). The elements of the neural network system 100 communicate with each other through a bus 150. In addition, the neural network system 100 may further include interfaces (not shown) for communication with other intellectual property (IP) blocks.

According to an embodiment, the CPU 110 generally controls the operations of the neural network system 100. The CPU 110 may include a single core or multiple cores. The CPU 110 processes or executes programs or data, which are stored in a storage area such as the memory 130.

For example, according to an embodiment, the CPU 110 executes an application and controls the neural network device 120 to perform neural network-based tasks involved in the execution of the application. A neural network may be at least one of various types of neural network models, such as a convolution neural network (CNN), a region with CNN (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, or a classification network.

According to an embodiment, the neural network device 120 performs a neural network operation based on input data. The neural network device 120 generates an information signal based on a result of performing the neural network operation. The neural network device 120 may include a neural network operation accelerator, a coprocessor, a digital signal processor (DSP), or an application specific integrated circuit (ASIC), etc. In some embodiments, the neural network device 120 includes at least one cluster of neural processing circuits.

According to a present embodiment, the neural network device 120 includes a calculation circuit 20 and performs a neural network operation based on a floating point calculation. The calculation circuit 20 performs a dot product operation on a plurality of floating point data items and accumulates dot product results. The plurality of floating point data items are divided into a plurality of floating point data pairs for a dot product operation and input to the calculation circuit 20.

According to an embodiment, a neural network includes real numbers, such as floating point data, expressed as floating point numbers. For example, floating point data may include a feature map, a kernel or weight map, or a bias, etc. When data is expressed using floating point, the data has a broad range of values, and an approximation of a real number can be appropriately expressed. However, embodiments of the inventive concept are not limited thereto, and the neural network may include integer data expressed as integers.

In an embodiment, the calculation circuit 20 supports a dot product operation on floating point data in various types of formats. The calculation circuit 20 can change at least one of an exponent bit field or a fraction bit field of the floating point data to a different bit width so that a dot product operation can be performed on a plurality of floating point data items that have different format types.

In an embodiment, in a dot product operation, the calculation circuit 20 performs an exponent addition operation on floating point data pairs and a fraction multiplication operation on the floating point data pairs, thereby generating an exponent addition result and a fraction multiplication result for each of the floating point data pairs.

In an embodiment, the calculation circuit 20 adds fraction multiplication results in a dot product operation. In this regard, the calculation circuit 20 performs an accumulation operation in the dot product operation by adding cumulative data to the fraction multiplication results. The cumulative data is generated by accumulating dot product results of the neural network device 120 that are stored in a buffer of the neural network device 120.

In an embodiment, before adding the cumulative data to the fraction multiplication results, the calculation circuit 20 performs an align shift to align floating points of the fraction multiplication results and the cumulative data with one another. The calculation circuit 20 performs an align shift on fraction parts of the cumulative data and the fraction multiplication results based on a maximum value identified from the exponent value of the cumulative data and exponent addition results.

In an embodiment, a shiftable bit width of an align shifter that is included in the calculation circuit 20 for dot product operations is decreased to a width that does not influence an operation accuracy required by the neural network system 100. Accordingly, the size of the align shifter and power consumption of the neural network device 120 can be reduced, and a dot product operation speed can be increased. When the neural network system 100 requires a relatively high calculation accuracy, the align shifter of the calculation circuit 20 is designed to align data with a relatively long bit width. When the neural network system 100 requires a relatively low calculation accuracy, the align shifter of the calculation circuit 20 is designed to align data with a relatively short bit width.

In an embodiment, the calculation circuit 20 simultaneously performs a dot product operation and an accumulation operation by adding the aligned fraction multiplication results to the aligned fraction part of the cumulative data. For this operation, the calculation circuit 20 includes an adder that simultaneously receives the aligned fraction multiplication results and the aligned fraction part of the cumulative data.

In an embodiment, the adder of the calculation circuit 20 includes separate first and second add circuits. For example, the first add circuit adds upper bits of the aligned fraction multiplication results to upper bits of the aligned fraction part of the cumulative data, and the second add circuit adds lower bits of the aligned fraction multiplication results to lower bits of the aligned fraction part of the cumulative data. The configuration where there are separate first and second add circuits is suitable for leading one detection with respect to addition result data output from the adder and can optimize a logic, such as a post adder, after the adder. A specific embodiment of the leading one detection will be described below.

Although the calculation circuit 20 is described in an embodiment as simultaneously performing the dot product operation and the accumulation operation, embodiments of the inventive concept are not limited thereto, and the calculation circuit 20 may be configured to perform only the dot product operation. In another embodiment, the calculation circuit 20 performs an align shift of the fraction multiplication results based on the maximum value identified from the exponent addition results and adds only the aligned fraction multiplication results.

According to a present embodiment, the neural network device 120 performs the neural network operation based on an integer calculation. The calculation circuit 20 performs the dot product operations on a plurality of integer data items and accumulates dot product results. The plurality of integer data items are divided into a plurality of integer data pairs for the dot product operation and input to the calculation circuit 20.

In an embodiment, the calculation circuit 20 performs an integer multiplication operation on the integer data pairs, thereby generating integer multiplication results that respectively correspond to the integer data pairs. Then, the calculation circuit 20 adds the integer multiplication results, thereby generating a dot product result. In an embodiment, the calculation circuit 20 performs an accumulation operation in the dot product operation by adding cumulative data to the integer multiplication results. The cumulative data may be stored in a buffer of the calculation circuit 20.

In an embodiment, the calculation circuit 20 further includes not only a floating point multiplier that performs the above-described floating point fraction multiplication operation but also an integer multiplier that performs an integer multiplication operation, and one of the first and second add circuits is shared with the floating point multiplier and the integer multiplier. In an embodiment, the calculation circuit 20 performs the integer multiplication operation on the integer data pairs using at least one of the floating point multiplier or the integer multiplier and adds integer multiplication results to cumulative data using at least one of the first or second add circuits.

Although the calculation circuit 20 is described in an embodiment as simultaneously performing the dot product operation and the accumulation operation, embodiments of the inventive concept are not limited thereto, and the calculation circuit 20 may be configured to perform only the dot product operation. In another embodiment, the calculation circuit 20 adds only the integer multiplication results.

Accordingly, in an embodiment, another adder is unnecessary for an integer multiplication operation, and therefore, the size and power consumption of the neural network device 120 can be reduced. A specific embodiment related to an operation of the calculation circuit 20 in an integer calculation mode will be described below.

In an embodiment, when operating in a floating point calculation mode, the calculation circuit 20 generates new cumulative data by performing operations such as normalization and rounding on the addition result data output from the adder. In addition, when operating in an integer calculation mode, the calculation circuit 20 generates the addition result data output from the adder as cumulative data. The new cumulative data is stored in a buffer of the calculation circuit 20.

In an embodiment, the neural network device 120 receives a plurality of floating point data items FPD or integer data items ID from the memory 130 as input data items and performs dot product operations on the floating point data items FPD or the integer data items ID using the calculation circuit 20. The neural network device 120 accumulates a plurality of dot product results using the calculation circuit 20. Cumulative data can be stored in a buffer of the neural network device 120.

In an embodiment, the neural network device 120 performs neural network operations using the floating point data items FPD or the integer data items ID and stores operation results in the memory 130. The neural network device 120 outputs the floating point data items FPD or the integer data items ID generated as operation results.

In an embodiment, the format type of input data input to the calculation circuit 20 may be different from the format type of output data output from the calculation circuit 20. For example, the input data may have a floating point 16 (FP16)-type format or a brain float 16 (BF16)-type format, and the output data may have a floating point 32 (FP32)-type format. In other words, 16-bit data may be input to the calculation circuit 20, and 32-bit data may be output as a result of a dot product operation and an accumulation operation. As another example, the input data may have an 8-bit integer (INT8) format, and the output data may have a 32-bit integer (INT32) format. In other words, 8-bit data may be input to the calculation circuit 20, and 32-bit data may be output as a result of a dot product operation and an accumulation operation. However, embodiments are not necessarily limited thereto. The calculation circuit 20 can receive data having a first type format and output data having a second type format after a dot product operation and an accumulation operation according to a standard applied to the neural network system 100.

In an embodiment, the neural network device 120 performs dot product operations and accumulation operations on the floating point data items FPD or the integer data items ID that are received from the memory 130 using the calculation circuit 20, and stores floating point data items FPD or the integer data items ID corresponding to an operation result in the memory 130. In some embodiments, the neural network device 120 exchanges the floating point data items FPD or the integer data items ID with the memory 130 through the bus 150 without intervention by the CPU 110. In other words, the neural network device 120 directly exchanges the floating point data items FPD or the integer data items ID with the memory 130.

In an embodiment, memory 130 stores programs or data that are used in the neural network system 100. The memory 130 also stores operational parameters, such as weights, biases, etc., for a neural network, parameters, such as a scale factor, biases, etc., for quantizing a neural network, input data, such as an input feature map, and output data, such as an output feature map). The operational parameters, the quantization parameters, the input data, and the output data may be included in the floating point data items FPD or the integer data items ID.

In an embodiment, the memory 130 is a dynamic random access memory (DRAM), but embodiments are not limited thereto. The memory 130 may include at least one of a volatile memory or a non-volatile memory. Non-volatile memory includes read-only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), or ferroelectric RAM (FRAM). Volatile memory includes DRAM, static RAM (SRAM), synchronous DRAM (SDRAM), phase-change RAM (PRAM), magnetic RAM (MRAM), resistive RAM (RRAM), or ferroelectric RAM (FeRAM), etc. In an embodiment, the memory 130 is at least one of a hard disk drive (HDD), a solid state drive (SSD), a compact flash (CF) card, a secure digital (SD) card, a micro-SD card, a mini-SD card, an extreme digital (xD)) card, or a memory stick.

In an embodiment, the sensor module 140 collects information about the surroundings of an electronic device on which the neural network system 100 is mounted. The sensor module 140 senses or receive signals, such as an image signal, a voice signal, a magnetic signal, a bio signal, or a touch signal, from outside of the electronic device and converts sensed or received signals into sensed data. For this operation, the sensor module 140 includes at least one of various kinds of sensing devices, such as a microphone, an imaging device, an image sensor, a light detection and ranging (LIDAR) sensor, an ultrasonic sensor, an infrared sensor, a bio sensor, or a touch sensor.

In an embodiment, the sense data is provided to the neural network device 120 as input data or is stored in the memory 130. The sensed data stored in the memory 130 can be provided to the neural network device 120. In an embodiment, the neural network system 100 further includes a graphics processing unit (GPU) that processes image data, and the sensed data is processed by the GPU and then provided to the memory 130 or the neural network device 120.

For example, in an embodiment, the sensor module 140 includes an image sensor and photographs the external environment of an electronic device and generates image data. Image data output from the sensor module 140 or image data processed by the GPU may include floating point data and may be either directly provided to the calculation circuit 20 or stored in the memory 130 before being provided to the calculation circuit 20. In some embodiments, the neural network system 100 further includes a pre-processor that processes data input to the neural network device 120, or a post-processor that processes data output from the neural network device 120.

In some embodiments, the neural network system 100 of FIG. 1 does not include the sensor module 140 and receives input data from a sensor module, etc., that is separately provided, through an interface.

Figure 2:
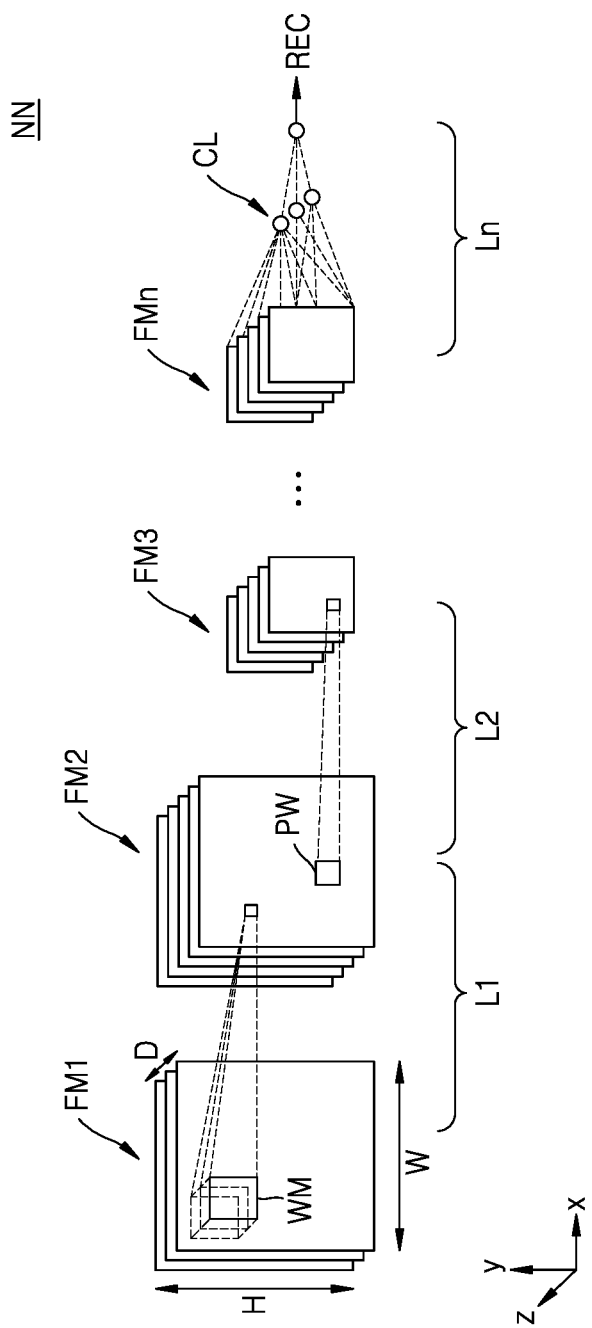
FIG. 2 illustrates an example of a neural network architecture.

FIG. 2 illustrates an example of a neural network architecture. Referring to FIG. 2, a neural network NN includes a plurality of layers, such as first through n-th layers L1 through Ln. The neural network NN with such a multilayer architecture is referred to as a deep neural network (DNN) or a deep learning architecture. Each of the first through n-th layers L1 through Ln may include a linear layer or non-linear layer. In an embodiment, at least one linear layer is combined with at least one non-linear layer, thereby forming a single layer. For example, linear layers include convolution layers and fully-connected layers, and non-linear layers include pooling layers and activation layers.

For example, in an embodiment, the first layer L1 corresponds to a convolution layer, the second layer L2 corresponds to a pooling layer, and the n-th layer Ln corresponds to a fully-connected layer as an output layer. The neural network NN further includes an activation layer and may further include other layers that perform other types of operations.

In an embodiment, each of the first through n-th layers L1 through Ln receive, as an input feature map, an image frame or a feature map generated in a previous layer, and generates an output feature map or a recognition signal REC by performing an operation on the input feature map. The feature map refers to data that represents various features of input data. For example, first through n-th feature maps FM1, FM2, FM3, and FMn may have a two-dimensional matrix or a three-dimensional matrix (or tensor) form that include a plurality of feature values. The first through n-th feature maps FM1 through FMn have a width W or column, a height H or row, and a depth D that respectively correspond to the x-axis, the y-axis, and the z-axis in a coordinate system. The depth D may be referred to as the number of channels.

In an embodiment, the first layer L1 generates the second feature map FM2 by convolving the first feature map FM1 with a weight map WM. The weight map WM has a two- or three-dimensional matrix form that includes a plurality of weights. The weight map WM filters the first feature map FM1 and may be referred to as a filter or a kernel. The depth, i.e., the number of channels, of the weight map WM is same as the depth, i.e., the number of channels, of the first feature map FM1. A convolution is performed on the same channels in both the weight map WM and the first feature map FM1. The weight map WM is shifted on the first feature map FM1 by traversing the first feature map FM1 using a sliding window. During a shift, each weight in the weight map WM is multiplied by and added to all feature values in an area where the weight map WM overlaps the first feature map FM1. One channel of the second feature map FM2 is generated by convolving the first feature map FM1 with the weight map WM. Although only one weight map WM is shown in FIG. 2, a plurality of weight maps WM may actually be convolved with the first feature map FM1 so that a plurality of channels of the second feature map FM2 are generated. In other words, the number of channels of the second feature map FM2 corresponds to the number of weight maps.

In an embodiment, the second layer L2 generates the third feature map FM3 by changing a spatial size of the second feature map FM2 through pooling. The pooling may be referred to as sampling or downsampling. A two-dimensional pooling window PW is shifted on the second feature map FM2 by a unit of the size of the pooling window PW, and a maximum value of the feature values, or an average of the feature values, in an area of the second feature map FM2 overlapped by the pooling window PW are selected. As such, the third feature map FM3 is generated by changing the spatial size of the second feature map FM2. The number of channels of the third feature map FM3 is the same as the number of channels of the second feature map FM2.

In an embodiment, the n-th layer Ln combines features of the n-th feature map FMn and categorize the input data into a class CL. The n-th layer Ln also generates the recognition signal REC that corresponds to the class CL. For example, when the input data corresponds to image data and the neural network NN performs image recognition, the n-th layer Ln extracts a class that corresponds to an object of an image represented by the image data based on the n-th feature map FMn, recognizes the object, and generates the recognition signal REC that corresponds to the object.

As described above with reference to FIG. 2, in an embodiment, the neural network NN has a complex architecture, and a neural network device that performs a neural network operation performs many operations, e.g., several hundreds of millions up to several tens of billions. According to a present embodiment, the neural network device 120 of FIG. 1 includes a floating point multiplier that performs floating point fraction multiplication operations, and an integer multiplier that performs integer multiplication operations, and the floating point multiplier and the integer multiplier share at least one adder, thereby reducing the power consumption and the design area thereof.

Figure 3A:
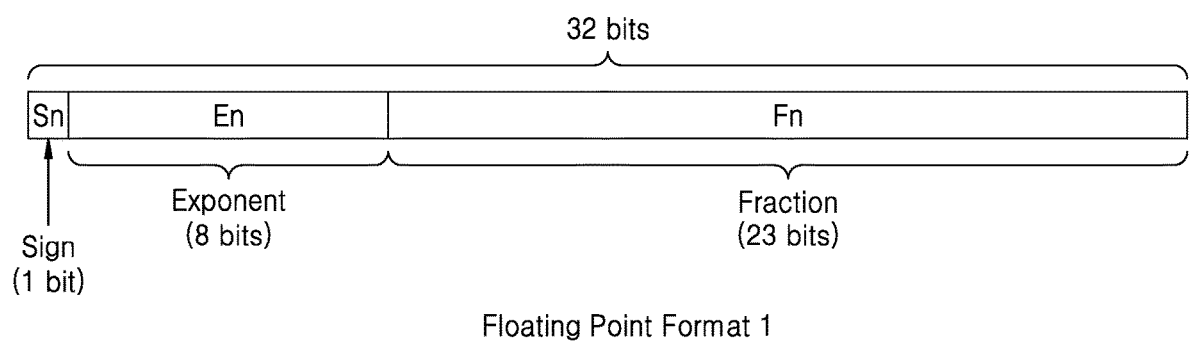
FIGS. 3A through 3C illustrate examples of types of floating point data formats.
Figure 3B:
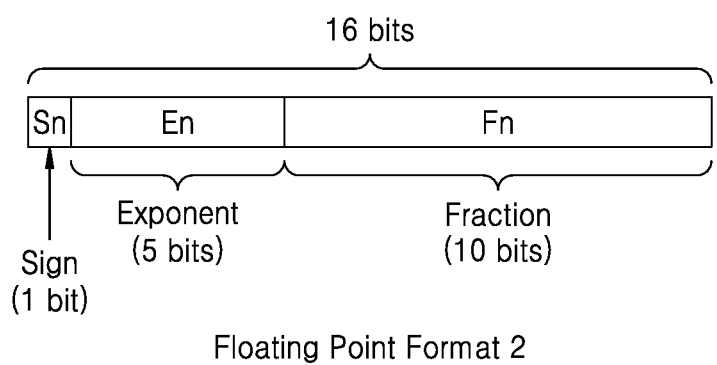
Figure 3C:
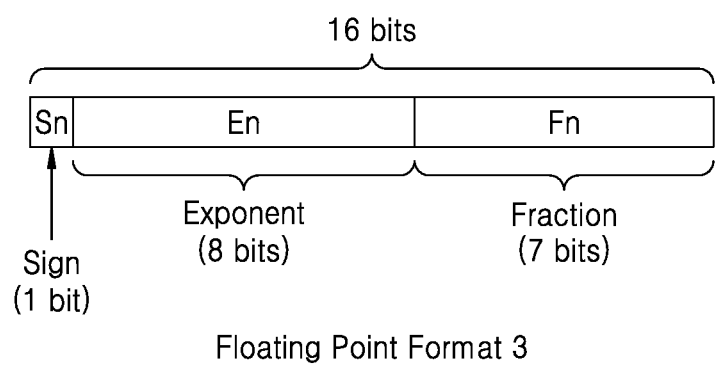
Figure 3D:
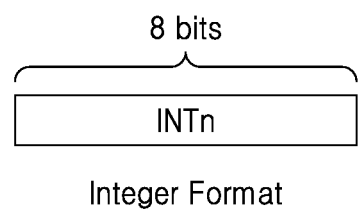
FIG. 3D illustrates an example of integer data format.

FIGS. 3A through 3C illustrate examples of types of floating point data formats, and FIG. 3D illustrates an example of integer data format.

Referring to FIG. 3A, floating point data is represented with a sign and a form of $1.a \times 2^b$, where "b" is an exponent and "a" is a fraction. According to the Institute of Electrical and Electronics Engineers (IEEE) 754 standard, which is the current standard for floating point arithmetic, in the case of a first type format, 32-bit floating point data includes one bit that represents a sign, 8 bits that represent an exponent, and 23 bits that represent a fraction. As shown in FIG. 3A, a most significant bit (MSB) represents a sign Sn, 8 bits following the MSB represent an exponent En, and the remaining 23 bits represent a fraction Fa (or a significand). Hereinafter, floating point data that has the first type format is referred to as floating point 32 (FP32).

Referring to FIG. 3B, in the case of a second type format according to the IEEE 754 standard, 16-bit floating point data includes one bit that represents a sign Sn, 5 bits that represent an exponent En, and 10 bits that represent a fraction Fn. In other words, 5 bits following the MSB represent an exponent, and the remaining 10 bits represent a fraction (or a significand). Hereinafter, floating point data that has the second type format is referred to as floating point 16 (FP16).

Referring to FIG. 3C, in the case of a third type format, 16-bit floating point data includes one bit that represents a sign Sn, 8 bits that represent an exponent En, and 7 bits that represent a fraction Fn. In other words, 8 bits following the MSB represent an exponent, and the remaining 7 bits represent a fraction (or a significand). Hereinafter, floating point data having the third type format may be referred to as BF16.

Referring to FIG. 3D, data in an integer format may be expressed in various types based on the existence or non-existence of a sign, and a data size, i.e., the number of bits. For example, a signed integer used for computing can be expressed as 8-bit 2's complement data that includes a sign, as shown in FIG. 3D. In the case of a signed number, the MSB represents a sign and the following 7 bits represent an integer INTn, and the signed number has a size of $\Sigma_0^6 INTn*2^n - INT_7*2^7$. In the case of an unsigned number, the unsigned number is a positive number and has a size of $\Sigma_0^7 INTn*2^n$.

According to an embodiment, a neural network device receives floating point data items that correspond to at least one of the first through third type formats and performs a dot product operation and an accumulation operation. For example, the neural network device receives floating point data items that correspond to at least one of an FP16-type format, a BF16-type format, or an FP32-type format and performs a dot product operation and an accumulation operation on the floating point data items in a floating point calculation mode, thereby outputting cumulative data in the FP32-type format. In another example, the neural network device receives integer data items that correspond to an INT8-type format and performs the dot product operation and the accumulation operation on the integer data items in an integer calculation mode, thereby outputting cumulative data in the INT8-type format.

However, embodiments are not limited thereto. In other embodiments, the neural network device may receive floating point data items or integer data items in other type formats and perform a dot product operation and an accumulation operation, thereby outputting cumulative data in an agreed format required by a neural network system.

Figure 4:
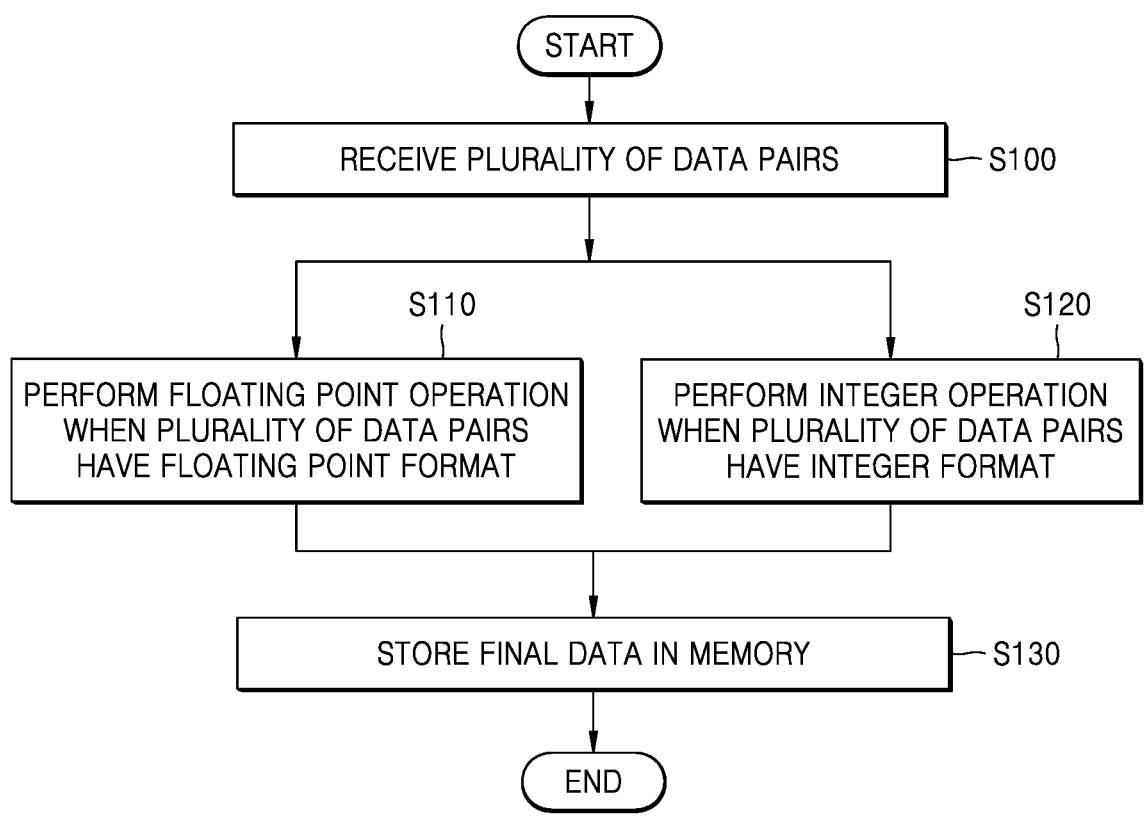
FIG. 4 is a flowchart of a method of operating a neural network device, according to an embodiment.

FIG. 4 is a flowchart of a method of operating a neural network device, according to an embodiment. The operating method of FIG. 4 is performed by the neural network device 120 of FIG. 1 for a neural network operation. For the sake of understanding, FIG. 1 will also be referred to in the description.

Referring to FIG. 4, in an embodiment, the neural network device 120 receives a plurality of data pairs in operation S100. The plurality of data pairs may be received from the memory 130. The data pairs may include input feature values, weights, function coefficients, etc., which are needed for the neural network operation. When the neural network device 120 processes a quantized neural network, the data pairs include quantization parameters. For example, the quantization parameters include a scale factor or an inverse scale factor, a bias, etc. The data pairs may be floating point data items or integer data items in various types of formats.

In operation S110, in an embodiment, the neural network device 120 performs a floating point operation when the plurality of data pairs are in a floating point format. The neural network device 120 obtains a plurality of fraction multiplication results that respectively correspond to the plurality of data pairs using a floating point multiplier and adds the plurality of fraction multiplication results using an adder to generate new cumulative data.

Specifically, in an embodiment, the neural network device 120 performs an align shift of the plurality of fraction multiplication results based on the maximum value of the plurality of fraction multiplication results that respectively correspond to the plurality of data pairs, and then adds the aligned plurality of fraction multiplication results using the adder to generate new cumulative data.

In an embodiment, the neural network device 120 adds upper bits of the aligned plurality of fraction multiplication results using a first add circuit in the adder, adds low bits of the aligned plurality of fraction multiplication results using a second add circuit in the adder, and adds operation results of the first add circuit and the second add circuit to generate new cumulative data.

In an embodiment, when the neural network device 120 simultaneously performs a dot product operation and an accumulation operation, the neural network device 120 receives existing cumulative data and performs an align shift of the plurality of fraction multiplication results and a fraction part of the existing cumulative data based on the maximum value of an exponent part of the existing cumulative data and a plurality of exponent addition results. Then, the neural network device 120 adds upper bits of the aligned plurality of fraction multiplication results to upper bits of the aligned fraction part of the existing cumulative data using the first add circuit. Then, the neural network device 120 adds lower bits of the aligned plurality of fraction multiplication results to lower bits of the aligned fraction part of the existing cumulative data using the second add circuit.

In operation S120, in an embodiment, the neural network device 120 performs an integer operation when the plurality of data pairs are in an integer format. In an embodiment, the neural network device 120 obtains a plurality of integer multiplication results that respectively correspond to the plurality of data pairs using an integer multiplier and adds the plurality of integer multiplication results using the adder to generate new cumulative data.

In an embodiment, the neural network device 120 obtains first integer multiplication results that respectively correspond to first data pairs of the plurality of data pairs using the integer multiplier. In an embodiment, the neural network device 120 obtains second integer multiplication results that respectively correspond to second data pairs of the plurality of data pairs using the floating point multiplier. The neural network device 120 adds the first integer multiplication results to the second integer multiplication results to generate new cumulative data.

In an embodiment, the neural network device 120 adds the first integer multiplication results using the first add circuit, adds the second integer multiplication results using the second add circuit, and adds operation results of the first add circuit and the second add circuit to generate new cumulative data.

In an embodiment, when the neural network device 120 simultaneously performs a dot product operation and an accumulation operation, the neural network device 120 receives existing cumulative data and adds the plurality of integer multiplication results using the adder to generate new cumulative data. The existing cumulative data may be received from the buffer.

In addition, in an embodiment, the neural network device 120 further performs other neural network operations, such as convolution, pooling, etc., in addition to the dot product operation in operations S110 and S120.

In an embodiment, the neural network device 120 stores final data that is generated in operations S110 and S120 in the memory 130 in operation S130.

Figure 5:
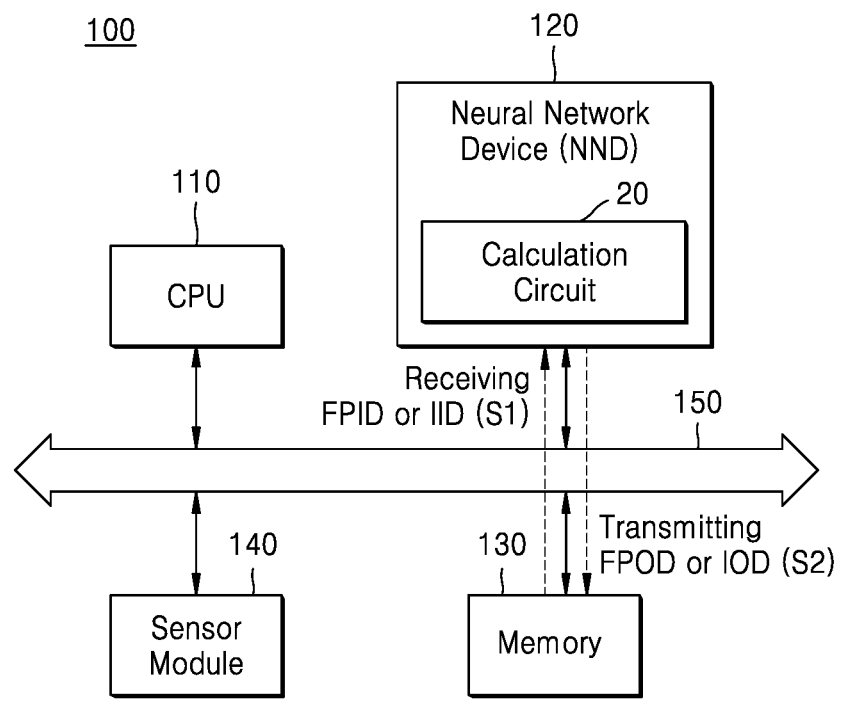
FIG. 5 illustrates the operations of a neural network system, according to an embodiment.

FIG. 5 illustrates the operations of the neural network system 100, according to an embodiment.

Referring to FIG. 5, in an embodiment, the neural network device 120 receives floating point input data items FPID or integer input data items IID from the memory 130 in operation SI. In some embodiments, the floating point input data items FPID or the integer input data items III are transmitted from the memory 130 to the neural network device 120 through the bus 150 without intervention by the CPU 110. For example, the neural network device 120 includes a direct memory access (DMA) controller, and the DMA controller accesses the memory 130 and reads the floating point input data items FPID or the integer input data items IID. The neural network device 120 performs a neural network operation that includes a dot product operation and an accumulation operation on the floating point input data items FPID or the integer input data items IID using the calculation circuit 20. The neural network device 120 generates floating point output data FPOD or integer output data items IOD as a result of the neural network operations and transmits the floating point output data FPOD to the memory 130 in operation S2.

As described above, according to a present embodiment, the neural network device 120 performs a dot product operation and an accumulation operation fast and efficiently with low power consumption.

Figure 6:
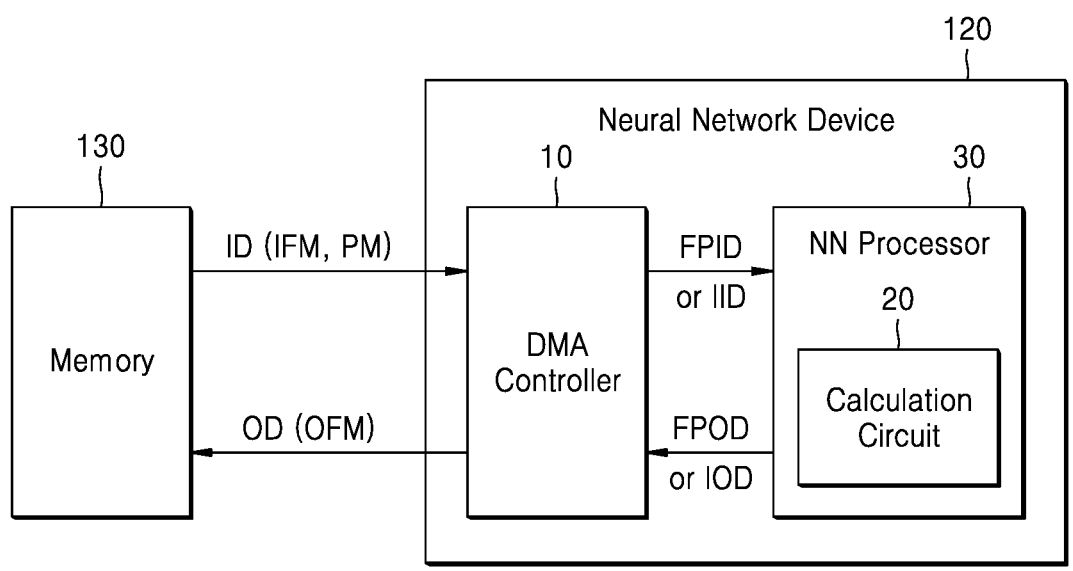
FIG. 6 illustrates a neural network device according to an embodiment.

FIG. 6 illustrates the neural network device 120 according to an embodiment. For convenience of description, the memory 130 is also illustrated.

Referring to FIG. 6, in an embodiment, the neural network device 120 includes a DMA controller 10 and a neural network processor 30. In an embodiment, the neural network processor 30 includes the calculation circuit 20 that performs a dot product operation and an accumulation operation.

In an embodiment, the DMA controller 10 directly communicates with the memory 130. The DMA controller 10 receives input data ID, such as the floating point input data items FPID or the integer input data items IID, from the memory 130 and transmits output data OD, such as the floating point output data FPOD or the integer output data items IOD generated as a result of a neural network operation to the memory 130 without intervention by other processors, such as a CPU or a GPU. For example, the floating point input data items FPID or the integer input data items IID may include an input feature map IFM, an operational parameter PM, or a weight map or kernel parameter. The floating point input data items FPID or the integer input data items IID may also include a quantization parameter.

In an embodiment, the calculation circuit 20 performs a dot product operation and an accumulation operation on the floating point input data items FPID or the integer input data items IID. The floating point input data items FPID or the integer input data items IID are divided into pairs of data items, and the calculation circuit 20 performs a dot product operation on each of the data pairs that are undergoing a dot product operation.

The calculation circuit 20 performs a dot product operation that includes an exponent addition operation and a fraction multiplication operation on each of the data pairs. In an embodiment, in a dot product operation and an accumulation operation, the calculation circuit 20 performs an align shift on a fraction part of the cumulative data and fraction multiplication results that respectively correspond to the data pairs based on an exponent value of the cumulative data and exponent addition results that respectively correspond to the data pairs, and then adds the fraction multiplication results to the fraction part of the cumulative data. In an embodiment, the calculation circuit 20 identifies the maximum value from the exponent addition results and the exponent value of the cumulative data; performs an align shift of each of the fraction multiplication results in a direction that corresponds to the sign of a difference between each of the exponent addition results and the maximum value by the number of bits that corresponds to the difference therebetween; and performs an align shift of the fraction part of the cumulative data in a direction that corresponds to the sign of a difference between the exponent value of the cumulative data and the maximum value by the number of bits that corresponds to the difference therebetween. The calculation circuit 20 simultaneously performs the dot product operation and the accumulation operation by adding the aligned fraction multiplication results to the aligned fraction part of the cumulative data, thereby generating new cumulative data.

In addition, in an embodiment, the calculation circuit 20 simultaneously performs a dot product operation that includes an integer multiplication operation on each of integer data pairs. In an embodiment, the calculation circuit 20 simultaneously performs a dot product operation and an accumulation operation by adding integer multiplication results to an integer part of the cumulative data that respectively corresponds to the integer data pairs, thereby generating new cumulative data.

Before or after the operation of the calculation circuit 20, in an embodiment, the neural network processor 30 may perform other neural network operations, such as convolution or pooling, besides a floating point calculation, and generates the floating point output data FPOD or the integer output data items IOD. For example, the floating point output data FPOD or the integer output data items IOD may include an output feature map OFM.

In an embodiment, the neural network processor 30 includes a processing element array that includes a plurality of processing elements. In addition, the neural network processor 30 includes a controller and a buffer that stores neural network parameters such as biases, weights, input features, or output features. The processing elements form the calculation circuit 20, and the neural network processor 30 performs a neural network operation that includes a floating point calculation and an integer calculation according to embodiments, using the calculation circuit 20.

Hereinafter, a configuration and operation of the calculation circuit 20 will be described.

Figure 7A:
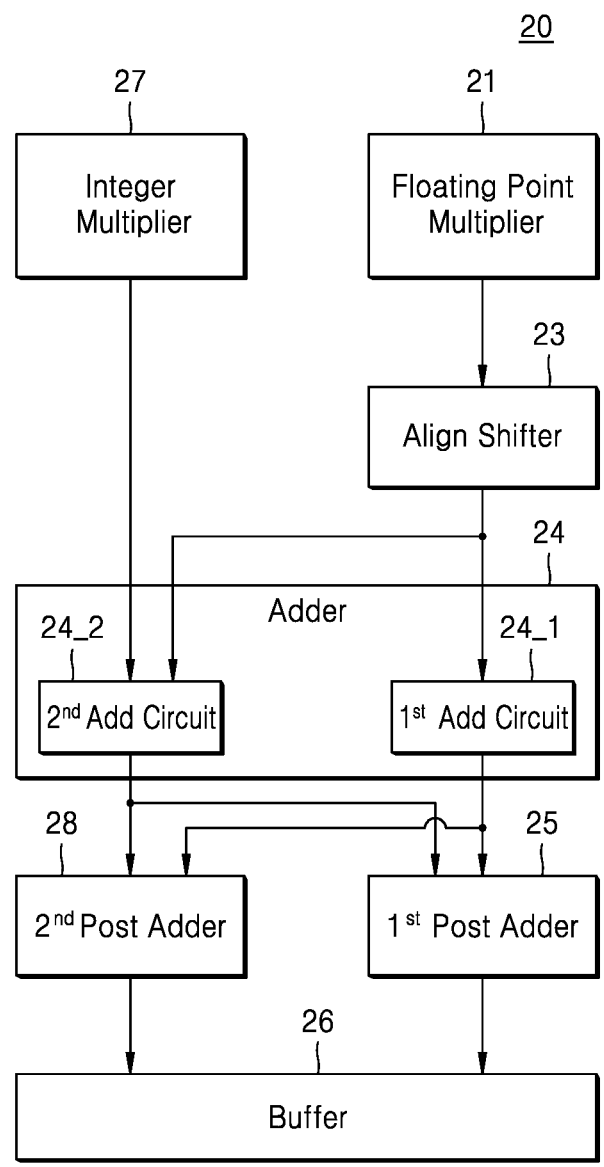
FIGS. 7A through 7C are block diagrams of calculation circuits in a neural network device, according to an embodiment.

FIG. 7A is a block diagram of the calculation circuit 20 of a neural network device, according to an embodiment. Specifically, FIG. 7A shows the calculation circuit 20 implemented as an application specific integrated circuit (ASIC).

Referring to FIG. 7A, in an embodiment, the calculation circuit 20 includes a floating point multiplier 21, an integer multiplier 27, an align shifter 23, an adder 24, a first post adder 25, a second post adder 28, and a buffer 26. Besides the elements shown in FIG. 7A, the calculation circuit 20 may further include a plurality of other elements that perform various neural network operations. The adder 24 includes a first add circuit 24_1 and a second add circuit 24_2 that are logically or physically separate from each other. In an embodiment, the calculation circuit 20 performs a dot product operation and an accumulation operation on both floating point data items and integer data items.

In an embodiment, the second add circuit 24_2 of the adder 24 is shared by the floating point multiplier 21 and the integer multiplier 27. The floating point multiplier 21 supports floating point operations on floating point data pairs when the calculation circuit 20 is in a floating point calculation mode and supports integer operations on integer data pairs when the calculation circuit 20 is in an integer calculation mode.

In an embodiment, when the calculation circuit 20 is in a floating point calculation mode, the floating point multiplier 21 performs a floating point calculation and provides fraction multiplication results to the first and second add circuits 24_1 and 24_2 through the align shifter 23.

In an embodiment, when the calculation circuit 20 is in floating point calculation mode, the adder 24 adds the aligned fraction multiplication results of the floating point data items to the fraction of cumulative data and provides the addition result data to the first post adder 25. The first post adder 25 generates second cumulative data by performing leading one detection, normalization, and rounding on the addition result data, reflects an updated exponent and stores the second cumulative data in the buffer 26.

When the calculation circuit 20 is in integer calculation mode, the integer multiplier 27 performs an integer calculation and provides first integer multiplication results to the second add circuit 24_2, and the floating point multiplier 21 performs an integer calculation and directly provides second integer multiplication results to the first add circuit 24_1 by bypassing the align shifter 23

In an embodiment, when the calculation circuit 20 is in integer calculation mode, the adder 24 adds integer multiplication results of the integer data items to cumulative data and provides the addition result to the second post adder 28. The second post adder 28 generates second output data based on the addition result and stores the second output data in the buffer 26.

In an embodiment, the first post adder 25 and the second post adder 28 are integrated with each other. In an embodiment, the first post adder 25 and the second post adder 28 are separate from each other.

Figure 7B:
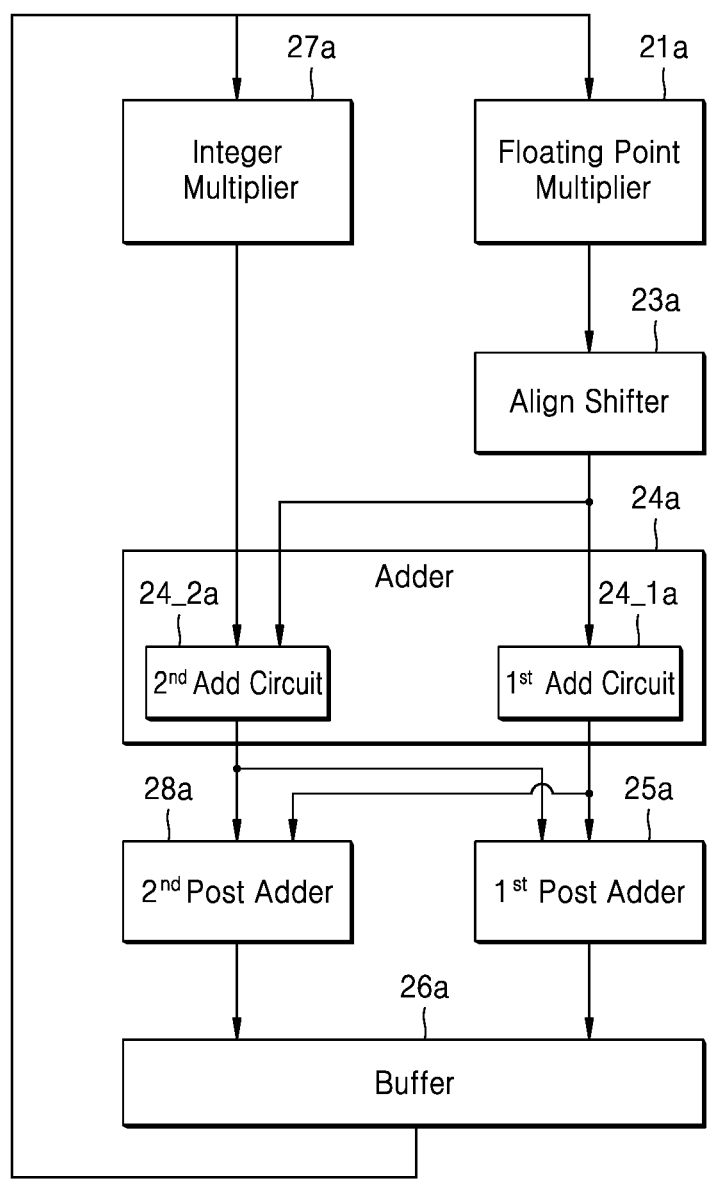
Figure 7C:
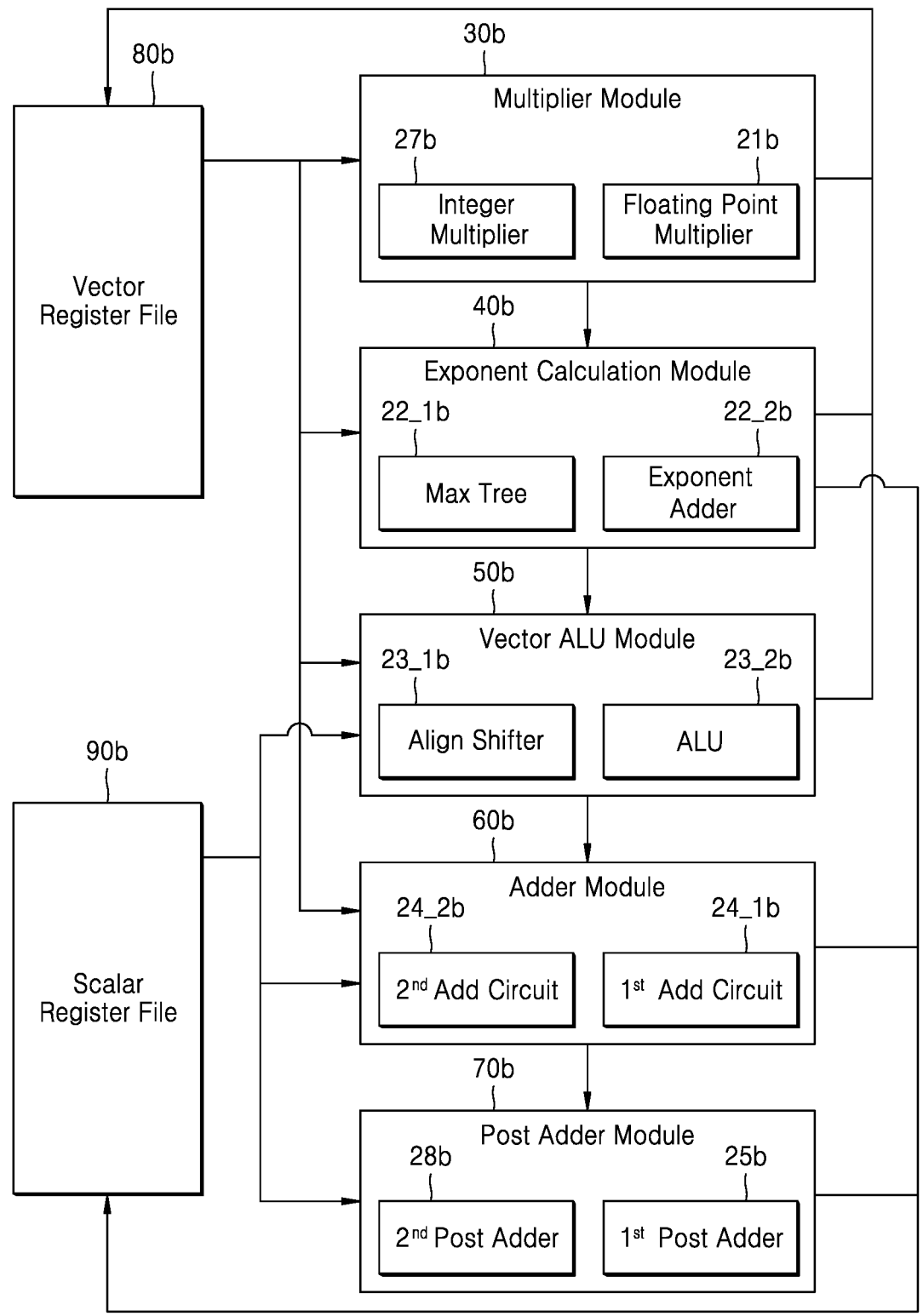

FIGS. 7B and 7C are block diagrams of calculation circuits 20a and 20b in a neural network device, according to an embodiment. Specifically, FIGS. 7B and 7C are block diagrams of calculation circuits 20a and 20b in which at least a part is implemented as a digital signal processor (DSP). The calculation circuits 20a and 20b, of which at least one is implemented as a DSP, receive at least one instruction and perform an operation according to the received instruction.

In some embodiments, the calculation circuit 20a of FIG. 7B is implemented as a DSP that performs a floating point operation or an integer operation based on an instruction. Referring to FIG. 7B, the calculation circuit 20a includes a floating point multiplier 21a, an integer multiplier 27a, an align shifter 23a, an adder 24a, a first post adder 25a, a second post adder 28a, and a buffer 26a. The adder 24a includes first and second add circuits 24_1a and 24_2a that are logically or physically separated from each other.

In an embodiment, the buffer 26a of the calculation circuit 20a of FIG. 7B stores floating point data items and integer data items. The floating point data items and integer data items stored in the buffer 26a are externally received floating point data items and integer data items input to the calculation circuit 20a, or floating point data or integer data that are operation results of the calculation circuit 20a. The buffer 26a may include a register file.

In an embodiment, the calculation circuit 20a receives an instruction with respect to the floating point operation or the integer operation, and performs the floating point operation or the integer operation based on the instruction. Specifically, the buffer 26a reads the floating point data items or the integer data items from an operand of the instruction received by the calculation circuit 20a, and transmits the read floating point data items or integer data items to the floating point multiplier 21a and the integer multiplier 27a. Further, the floating point multiplier 21a and the integer multiplier 27a respectively perform the floating point operation or the integer operation that correspond to the instruction on the received floating point data items or integer data items. In addition, at least one of components of the calculation circuit 20a, such as the align shifter 23a, the adder 24a, the first post adder 25a, the second post adder 28a, or the buffer 26a, that performs operations after the floating point multiplier 21a and the integer multiplier 27a may subsequently perform an operation corresponding to the instruction based on the operation results of the floating point multiplier 21a and the integer multiplier 27a. The floating point data or the integer data that is a final operation result of the calculation circuit 20a is stored in the buffer 26a.

In an embodiment, the floating point multiplier 21a, the integer multiplier 27a, the align shifter 23a, the adder 24a, the first post adder 25a, the second post adder 28a and the buffer 26a of the calculation circuit 20a of FIG. 7B respectively correspond to the floating point multiplier 21, the integer multiplier 27, the align shifter 23, the adder 24, the first post adder 25, the second post adder 28, and the buffer 26 of the calculation circuit 20 of FIG. 7A, and thus, redundant descriptions thereof are omitted.

In some embodiments, the calculation circuit 20b of FIG. 7C performs the floating point operation or the integer operation based on a plurality of instructions. Referring to FIG. 7C, the calculation circuit 20b include a multiplier module 30b, an exponent operation module 40b, a vector ALU module 50b, an adder module 60b, a post adder module 70b, a vector register file 80b, and a scalar register file 90b.

In an embodiment, the multiplier module 30b includes a floating point multiplier 21b and an integer multiplier 27b. The exponent operation module 40b includes a Max Tree 22_1b and an exponent adder 22_2b. The vector ALU module 50b includes an align shifter 23_1b and an ALU 23_2b. The adder module 60b includes a first add circuit 24_1b and a second add circuit 24_2b. The post adder module 70b includes a first post adder 25b and a second post adder 28b.

In an embodiment, the vector register file 80b and the scalar register file 90b of the calculation circuit 20b of FIG. 7C store various types of data related to floating point operations or integer operations. For example, the vector register file 80b stores externally received floating point data items and integer data items input to the calculation circuit 20b or stores various data items calculated while performing the floating point operations or the integer operations, and the scalar register file 90b stores floating point data or integer data that is the operation result of the calculation circuit 20b, or stores various other data calculated while performing the floating point operations or the integer operations. Although FIG. 7C shows the vector register file 80b and the scalar register file 90b as separate elements, embodiments are not limited thereto, and in other embodiments the vector register file 80b and the scalar register file 90b are implemented as one buffer.

In an embodiment, the calculation circuit 20b receives a plurality of instructions with respect to the floating point operations or the integer operations, and performs the floating point operations or the integer operations based on the plurality of instructions. The plurality of instructions correspond to a combination of instructions that correspond to one floating point operation or integer operation, and include instructions for each of the aforementioned modules.

Specifically, in an embodiment, the vector register file 80b of the calculation circuit 20b of FIG. 7C reads floating point data items or integer data items from an operand of an input instruction and transmits the read floating point data items or integer data items to the floating point multiplier 21b and the integer multiplier 27b.

Further, in an embodiment, the floating point multiplier 21b and the integer multiplier 27b each perform a multiplication operation on the floating point data items or the integer data items received from the vector register file 80b based on the input instruction, and store the multiplication results in an entry of the vector register file 80b that corresponds to a second instruction operand.

In addition, in an embodiment, the exponent operation module 40b receives the floating point data items from the vector register file 80b entry that corresponds to the input instruction operand for the floating point operation, calculates a maximum exponent value based on exponent parts of the floating point data items using the max tree 22_1b, and performs an addition operation on the exponent parts using the exponent units the exponent adder 22_2b. Then, the exponent operation module 40b stores the maximum exponent value in an entry of the scalar register file 90b that corresponds to the input instruction operand, and stores exponent addition results in the vector register file 80b entry that corresponds to input instruction operand.

Further, in an embodiment, the vector ALU module 50b receives the maximum exponent value from the scalar register file 90b entry that corresponds to the input instruction operand of the floating point operation, and receives the exponent addition results from the vector register file 80b entry that corresponds to the input instruction operand. In addition, the vector ALU module 50b calculates a shift amount using the ALU 23_2b, and stores the calculated shift amount in the vector register file 80b entry that corresponds to the input instruction operand. Further, the vector ALU module 50b receives the shift amount and fraction multiplication results of the floating point data items from the the the vector register file 80b entry that corresponds to a next input instruction operand, shifts the fraction multiplication results by the shift amount using the align shifter 23_1b, and then stores the aligned fraction multiplication results in the vector register file 80b entry that corresponds to the instruction operand. The above-described series of operations may be expressed as one instruction combination or two or more instruction combinations according to a structure of the DSP, and each of the above-described series of operations may be implemented as a multi-cycle operation.

In addition, in an embodiment, the adder module 60b receives the aligned fraction multiplication results from the vector register file 80b entry that corresponds to the input instruction operand for the floating point operation. In addition, the adder module 60b performs an addition operation on the aligned fraction multiplication results based on an opcode of the input instruction using the first add circuit 24_1b and the second add circuit 24_2b, and then stores the addition result in the scalar register file 90b entry that corresponds to the input instruction operand.

In addition, in an embodiment, the adder module 60b receives multiplication results of the integer data from the vector register file 80b entry that corresponds to the input instruction operand for the integer operation. In addition, the adder module 60b performs the addition operation on the multiplication results of the integer data based on the opcode of the input instruction using the first add circuit 24_1b and the second add circuit 24_2b, and then stores the addition result in the scalar register file 90b entry that corresponds to the input instruction operand.

In addition, in an embodiment, the post adder module 70b receives the addition result from the scalar register file 90b entry that corresponds to the input instruction operand. In addition, the post adder module 70b performs a post-addition operation using one of the first post adder 25b or the second post adder 28b that is selected based on the opcode of the input instruction.

Comparing the calculation circuit 20a of FIG. 7B with the calculation circuit 20b of FIG. 7C, the calculation circuit 20a of FIG. 7B operates based on one instruction, whereas the calculation circuit 20b of FIG. 7C can operate based on a plurality of instructions. However, with reference to FIG. 7C, the instructions described with reference to the operation of the calculation circuit 20b are merely examples, and the calculation circuit 20b can be implemented to perform the floating point operation or the integer operation based on fewer instructions or more instructions.

The floating point multiplier 21b, the integer multiplier 27b, the align shifter 23b, the ALU 23_2b, the first add circuit 24_1b, the second add circuit 24_2b, the first post adder 25b and the second post adder 28b of the calculation circuit 20b of FIG. 7C respectively correspond to the floating point multiplier 21, the integer multiplier 27, the align shifter 23, the first add circuit 24_1, the second adding circuit 24_2, the first post adder 25, and the second post adder 28 of the calculation circuit 20 of FIG. 7A, and thus, detailed descriptions thereof are omitted.

In some embodiments, the calculation circuit 20b of FIG. 7C is implemented as a functional block of a DSP. For example, the multiplier module 30b, the vector ALU module 50b, and the adder module 60b can be implemented as general DSPs, or can be shared with an operation module of an existing DSP, and the exponent operation module 40b and the post adder module 70b can be newly added to complete a series of operations. However, the example in which the calculation circuit 20b is implemented as a plurality of arithmetic devices is not limited to the above-described example, and the calculation circuit 20b may be implemented as a plurality of arithmetic devices in various combinations.

According to an embodiment, in addition to the elements shown in FIGS. 7B and 7C, the calculation circuits 20a and 20b further include a plurality of other elements that perform various neural network operations. Hereinafter, for convenience of description, the calculation circuit 20 is mainly described, but the description may also similarly apply to the calculation circuits 20a and 20b.

Figure 8B:
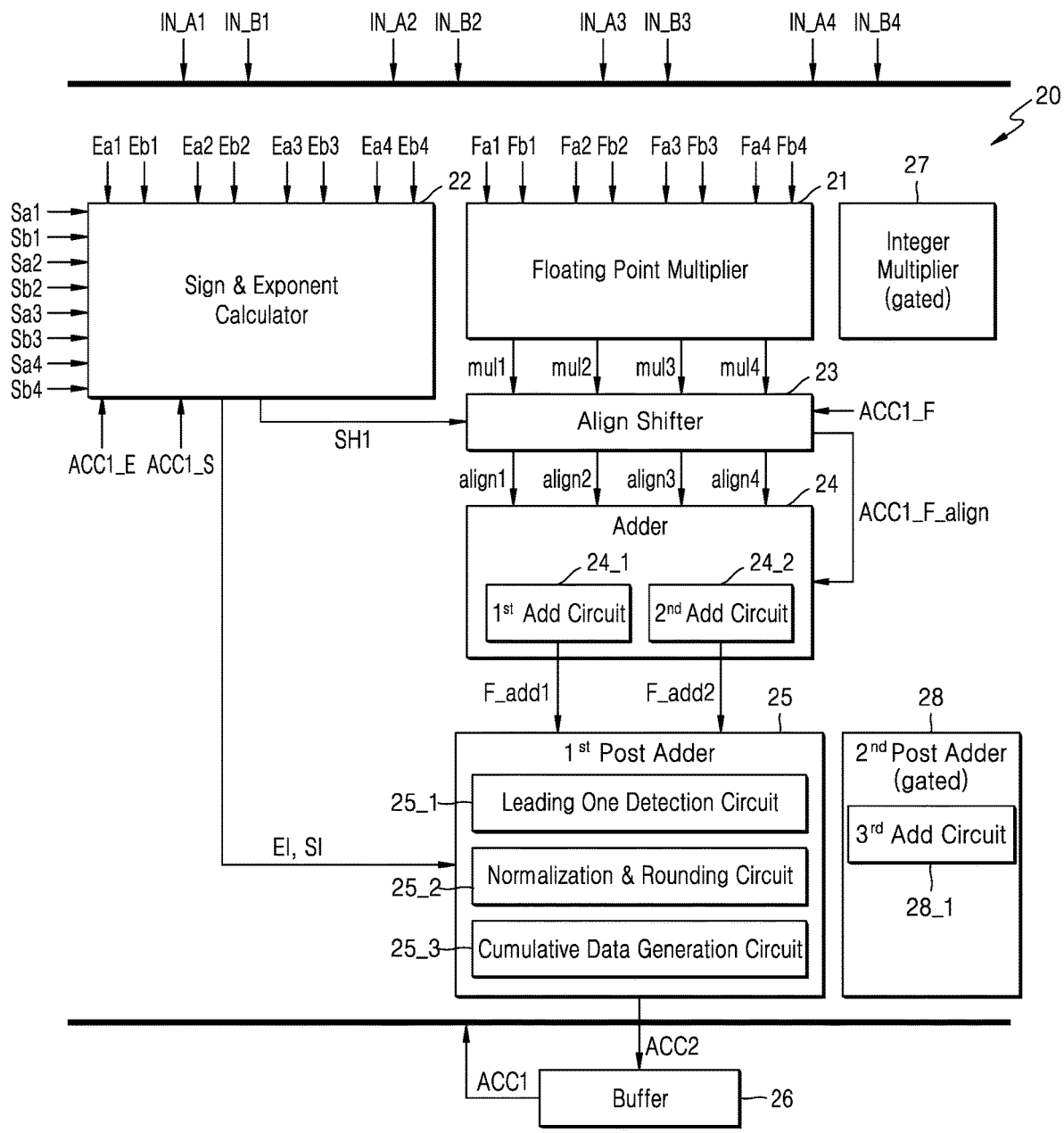
FIG. 8B shows the calculation circuit that performs a dot product operation in a floating point calculation mode, according to an embodiment.
Figure 8C:
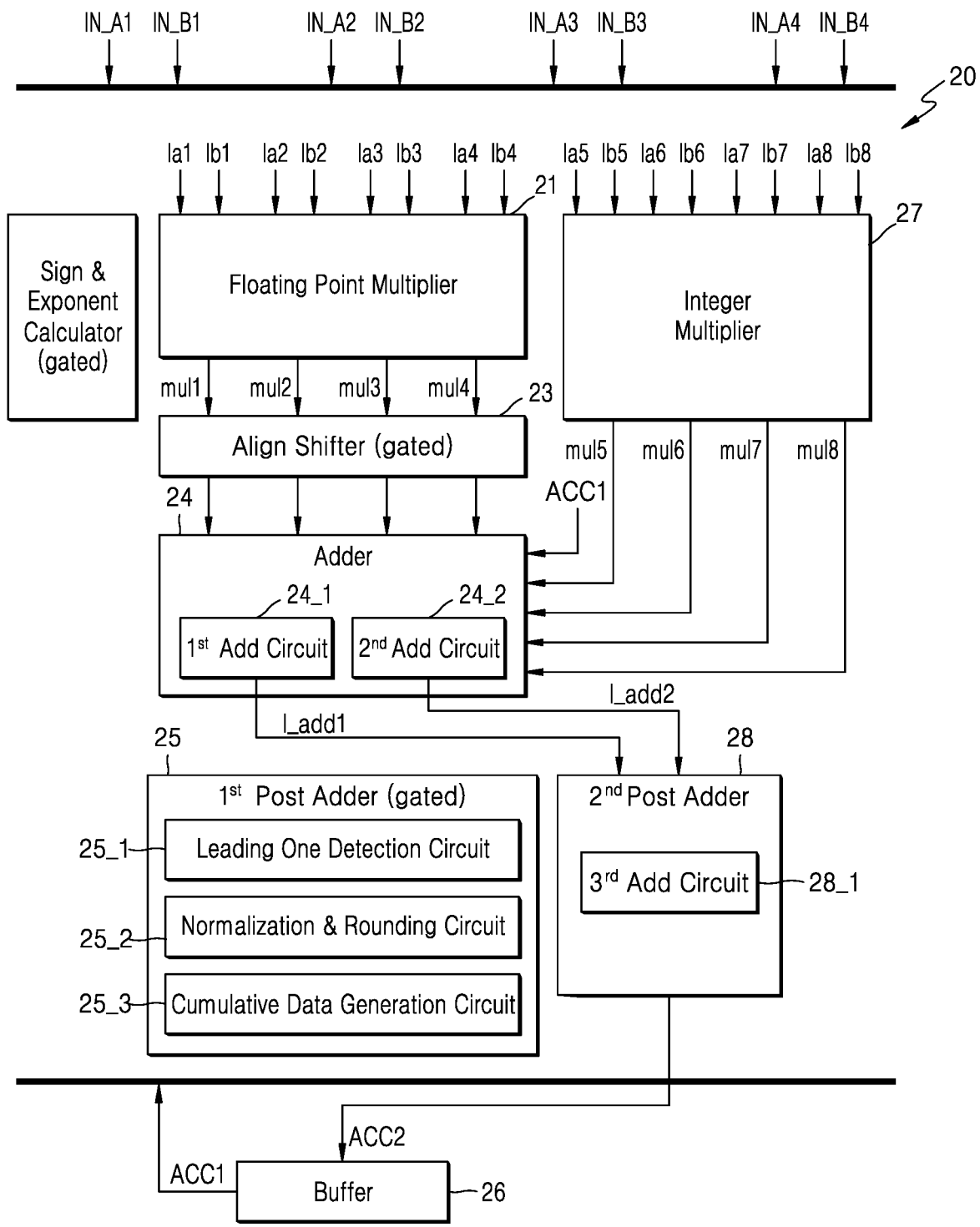
FIG. 8C shows the calculation circuit that performs the dot product operation in an integer calculation mode, according to an embodiment.

FIG. 8A illustrates format types of data pairs input to the calculation circuit 20, FIG. 8B illustrates the calculation circuit 20 that performs a dot product operation in a floating point calculation mode, according to an embodiment, and FIG. 8C illustrates the calculation circuit 20 that performs the dot product operation in an integer calculation mode, according to an embodiment.

Referring to FIG. 8A, in an embodiment, in a first case Case1, the calculation circuit 20 receives first and second data IN_A and IN_B that are floating point data items with the same type of format for a dot product operation. Respective sign bit fields Sa and Sb of the first and second data IN_A and IN_B have the same width, respective exponent bit fields Ea and Eb of the first and second data IN_A and IN_B have the same width, and respective fraction bit fields Fa and Fb of the first and second data IN_A and IN_B have the same width. For example, the first and second data IN_A and IN_B have the FP16-type format.

In a second case Case2 in an embodiment, the calculation circuit 20 receives the first and second data IN_A and IN_B that are floating point data items with different type formats for a dot product operation. The respective sign bit fields Sa and Sb of the first and second data IN_A and IN_B have the same width as each other, the respective exponent bit fields Ea and Eb of the first and second data IN_A and IN_B have different widths from each other, and the respective fraction bit fields Fa and Fb of the first and second data IN_A and IN_B have different widths from each other. For example, the first and second data IN_A and IN_B are respectively the FP16-type format and the BF16-type format.

In a third case Case3 in an embodiment, the calculation circuit 20 receives the first and second data IN_A and IN_B that are floating point data items with the same type of format for a dot product operation. The respective sign bit fields Sa and Sb of the first and second data IN_A and IN_B have the same width, the respective exponent bit fields Ea and Eb of the first and second data IN_A and IN_B have the same width, and the respective fraction bit fields Fa and Fb of the first and second data IN_A and IN_B have the same width. For example, the first and second data IN_A and IN_B have the BF16-type format.

In a fourth case Case4 in an embodiment, the calculation circuit 20 receives the first and second data IN_A and IN_B that are integer data items with the same type of format for a dot product operation. Respective integer bit fields Ia and Ib of the first and second data IN_A and IN_B have the same width. When the first and second data IN_A and IN_B express a signed number, each of the first and second data IN_A and IN_B include a sign bit, and when the first and second data IN_A and IN_B express an unsigned number, the sign bit may be omitted. For example, the first and second data IN_A and IN_B have an INT8-type format.

In an embodiment, each of the first and second data IN_A and IN_B input to the calculation circuit 20 include a pair of integer data. For example, when the calculation circuit 20 includes a floating point multiplier that can perform an operation on n-bit input data, where n is a positive integer, and a multiplication operation on k bits, where k is a positive integer, if the integer data is expressed in m bits, where m is a positive integer, that is equal to or less than the k bits and is equal to or less than ½ of the n bits, the first and second data IN_A and IN_B include the pair of integer data. Hereinafter, for ease of description, it is assumed that the calculation circuit 20 performs an operation on 16-bit input data and includes a floating point multiplier that can perform a multiplication operation on 8-bit or 11-bit data, and the integer data is expressed in 8 bits. That is, when the first and second data IN_A and IN_B have an integer format, each of the first and second data IN_A and IN_B includes a pair of 8-bit integer data items, and when the first and second data IN_A and IN_B have a floating point format, each of the first and second data IN_A and IN_B includes one 16-bit floating point data item. However, the above assumption is merely an embodiment, and embodiments of the inventive concept are not limited thereto. Referring to FIG. 8B, the calculation circuit 20 includes the floating point multiplier 21, the integer multiplier 27, a sign and exponent calculator 22, the align shifter 23, the adder 24, the first post adder 25, the second post adder 28, and the buffer 26. The adder 24 includes the first add circuit 24_1 and the second add circuit 24_2. The first post adder 25 includes a leading one detection circuit 25_1, a normalization and rounding circuit 25_2, and a cumulative data generation circuit 25_3. The second post adder 28 includes a third add circuit 28_1.

In an embodiment, the calculation circuit 20 may operate in a floating point calculation mode in which a floating point operation is performed or an integer calculation mode in which an integer operation is performed. An operation of the calculation circuit 20 in floating point calculation mode is first described.

Referring to FIG. 8B, in an embodiment, the calculation circuit 20 receives first cumulative data ACC1 from the buffer 26 in floating point calculation mode. A sign ACC1_S and an exponent ACC1_E of the first cumulative data ACC1 are input to the sign and exponent calculator 22, and a fraction ACC1_F of the first cumulative data ACC1 is input to the align shifter 23. However, when the calculation circuit 20 does not perform an accumulation operation, the operation of receiving the first cumulative data ACC1 of the calculation circuit 20 is omitted.

In an embodiment, the calculation circuit 20 performs a dot product operation on first through fourth input data pairs. Further, all of the first through fourth input data pairs correspond to floating point data. The first input data pair includes first and second input data IN_A1 and IN_B1, the second input data pair includes third and fourth input data IN_A2 and IN_B2, the third input data pair includes fifth and sixth input data IN_A3 and IN_B3, and the fourth input data pair includes seventh and eighth input data IN_A4 and IN_B4. Respective signs Sa1, Sb1, Sa2, Sb2, Sa3, Sb3, Sa4, and Sb4 and respective exponents Ea1, Eb1, Ea2, Eb2, Ea3, Eb3, Ea4, and Eb4 of the first through eighth input data IN_A1, IN_B1, IN_A2, IN_B2, IN_A3, IN_B3, IN_A4, and IN_B4 are input to the sign and exponent calculator 22. Respective fractions Fa1, Fb1, Fa2, Fb2, Fa3, Fb3, Fa4, and Fb4 of the first through eighth input data IN_A1, IN_B1, IN_A2, IN_B2, IN_A3, IN_B3, IN_A4, and IN_B4 are input to the floating point multiplier 21.

In an embodiment, the floating point multiplier 21 generates first through fourth fraction multiplication results mul1, mul2, mul3, and mul4 by performing multiplication operations on the fractions Fa1, Fb1, Fa2, Fb2, Fa3, Fb3, Fa4, and Fb4 and provides the first through fourth fraction multiplication results mul1, mul2, mul3, and mul4 to the align shifter 23. In an embodiment, the floating point multiplier 21 may include an 11-bit multiplier or a 24-bit or 32-bit multiplier that has an extended number of bits.

In an embodiment, the sign and exponent calculator 22 generates exponent information EI and sign information SI by determining a sign and performing exponent addition operations based on the signs Sa1, Sb1, Sa2, Sb2, Sa3, Sb3, Sa4, and Sb4 and the exponents Ea1, Eb1, Ea2, Eb2, Ea3, Eb3, Ea4, and Eb4.

In an embodiment, the sign and exponent calculator 22 identifies the maximum value from the exponent addition results and a value of the exponent ACC1_E of the first cumulative data ACC1, and, based on the maximum value, generates first shift information SHI that is provided to the align shifter 23. The first shift information SHI includes information about a shift direction and a shift amount that correspond to each of the first through fourth fraction multiplication results mul1, mul2, mul3, and mul4 from the floating point multiplier 21 and the fraction ACC1_F of the first cumulative data ACC1. In detail, the sign and exponent calculator 22 generates the first shift information SHI used by the align shifter 23 to align shift of each of the first through fourth fraction multiplication results mul1, mul2, mul3, and mul4 and the fraction ACC1_F of the first cumulative data ACC1 in a direction that corresponds to the sign of a difference between each of the exponent addition results and the exponent ACC1_E of the first cumulative data ACC1 and the maximum value by the number of bits that corresponds to the difference therebetween.

In an embodiment, the align shifter 23 performs an align shift of the first through fourth fraction multiplication results mul1, mul2, mul3, and mul4 and the fraction ACC1_F of the first cumulative data ACC1 based on the first shift information SHI and provides first through fourth aligned fraction multiplication results align1, align2, align3, and align4 and an aligned fraction ACC1_F align to the adder 24.

In an embodiment, the adder 24 simultaneously receives the first through fourth aligned fraction multiplication results align1, align2, align3, and align4 and the aligned fraction ACC1_F align and simultaneously performs a dot product operation and an accumulation operation. The adder 24 includes the first add circuit 24_1 and the second add circuit 24_2. The first add circuit 24_1 generates first addition result data F_add1 by adding upper bits that include respective MSBs of the first through fourth aligned fraction multiplication results align1, align2, align3, and align4 and the aligned fraction ACC1_F_align. The second add circuit 24_2 generates second addition result data F_add2 by adding lower bits that include respective least significant bits (LSBs) of the first through fourth aligned fraction multiplication results align1, align2, align3, and align4 and the aligned fraction ACC1_F_align.

In an embodiment, the first post adder 25 receives the first and second addition result data F_add1 and F_add2 and generates second cumulative data ACC2.

In an embodiment, the leading one detection circuit 25_1 sums of the first and second addition result data F_add1 and F_add2 that yields third addition result data, performs in parallel a first leading one detection on a first number of upper bits of the third addition result data, and a second leading one detection on a second number of lower bits of the third addition result data, where the upper bits of the third addition result data include the MSB, and the lower bits of the third addition result data include the LSB. In other words, the leading one detection circuit 25_1 detects "1" while right shifting a first number of upper bits of the third addition result data during the first leading one detection. The leading one detection circuit 25_1 detects "1" while right shifting a second number of lower bits of the third addition result data that exclude the first number of upper bits during the second leading one detection. In an embodiment, the first number differs from the second number. For example, the first number is less than the second number. The leading one detection circuit 25_1 shifts the third addition result data based on the results of the first and second leading one detections. In detail, the leading one detection circuit 25_1 shifts the third addition result data in a direction that corresponds to the result of the first or second leading one detection having detected "1" by the number of bits that corresponds to the result of the first or second leading one detection.

In an embodiment, the normalization and rounding circuit 25_2 normalizes the shifted third addition result data according to the position of "1" and rounds the shifted third addition result data according to the number of bits in the format of data output from the calculation circuit 20.

In an embodiment, the cumulative data generation circuit 25_3 generates the second cumulative data ACC2 by reflecting an exponent value and a sign in the normalized and rounded third addition result data based on the exponent information EI and the sign information SI, and stores the second cumulative data ACC2 in the buffer 26. Meanwhile, in the floating point calculation mode, the integer multiplier 27 and the second post adder 28 that are concerned with integer operations are gated.

Next, an operation of the calculation circuit 20 in integer calculation mode is described.

Referring to FIG. 8C, in an embodiment, the calculation circuit 20 receives the first cumulative data ACC1 that is integer data from the buffer 26 in integer calculation mode.

The first cumulative data ACC1 is input to the adder 24. However, when the calculation circuit 20 does not perform an accumulation operation, an operation of receiving the first cumulative data ACC1 of the calculation circuit 20 is omitted.

In an embodiment, the calculation circuit 20 performs a dot product operation on the first through eighth input data IN_A1, IN_B1, IN_A2, IN_B2, IN_A3, IN_B3, IN_A4, and IN_B4 in the integer calculation mode. Each of the first through eighth input data IN_A1, IN_B1, IN_A2, IN_B2, IN_A3, IN_B3, IN_A4, and IN_B4 includes a pair of integer data items. The first input data IN_A1 includes first integer data Ia1 and second integer data Ia2, the second input data IN_B1 includes third integer data Ib1 and fourth integer data Ib2, the third input data IN_A2 includes fifth integer data Ia3 and sixth integer data Ia4, the fourth input data IN_B2 includes seventh integer data Ib3 and the eighth integer data Ib4, the fifth input data IN_A3 includes the ninth integer data Ia5 and the tenth integer data Ia6, the sixth input data IN_B3 includes eleventh integer data Ib5 and twelfth integer data Ib6, the seventh input data IN_A4 includes thirteenth integer data Ia7 and fourteenth integer data Ia8, and the eighth input data IN_B4 includes fifteenth integer data Ib7 and sixteenth integer data Ib8.

In an embodiment, the first through eighth integer data Ia1, Ib1, Ia2, Ib2, Ia3, Ia3, Ia4, and Ib4 are input to the floating point multiplier 21, and the ninth through sixteenth integer data Ia5, Ib5, Ia6, Ib6, Ia7, Ia7, Ia8, and Ib8 are input to the integer multiplier 27. The floating point multiplier 21 generates first through fourth integer multiplication results mul1, mul2, mul3, and mul4 by performing multiplication operations on first through eighth integer data Ia1, Ib1, Ia2, Ib2, Ia3, Ia3, Ia4, and Ib4 and provides the first through fourth integer multiplication results mul1, mul2, mul3, and mul4 to the first add circuit 24_1 of the adder 24 by bypassing the align shifter 23.

In an embodiment, the integer multiplier 27 generates fifth through eighth integer multiplication results mul5, mul6, mul7, and mul8 by performing multiplication operations on the ninth through sixteenth integer data Ia5, Ib5, Ia6, Ib6, Ia7, Ia7, Ia8, and Ib8 and provides fifth through eighth integer multiplication results mul5, mul6, mul7, and mul8 to the second add circuit 24_2 of the adder 24. The first add circuit 24_1 generates first addition result data I_add1 by adding upper bits of the first through fourth integer multiplication results mul1, mul2, mul3, and mul4 and the first cumulative data ACC1 that include respective MSBs. The second add circuit 24_2 generates second addition result data I_add2 by adding lower bits of the fifth through eighth integer multiplication results mul5, mul6, mul7, and mul8 and the first cumulative data ACC1 that include respective LSBs.

According to an embodiment, one of the first and second add circuits 24_1 and 24_2 of the adder 24 is shared with an integer multiplier that performs an integer multiplication operation, and thus can be used for a floating point calculation or an integer calculation, etc. Therefore, a size of a neural network device that includes the calculation circuit 20 can be effectively reduced.

In an embodiment, the second post adder 28 receives the first and second addition result data I_add1 and I_add2 and generates second cumulative data ACC2. The second post adder 28 includes a third add circuit 28_1. The third add circuit 28_1 adds the first and second addition result data I_add1 and I_add2 and generate the second cumulative data ACC2. Meanwhile, in integer calculation mode, the sign and exponent calculator 22, the align shifter 23, and the first post adder 25 that are concerned with sign and exponent operations are gated.

The descriptions of the calculation circuit 20 given with reference to FIGS. 8A through 8C are merely examples, and embodiments are not limited thereto. The calculation circuit 20 may be implemented in various ways in other embodiments. The calculation circuit 20 receives and performs dot product operations on various numbers of input data items in various type formats.

Figure 9A:
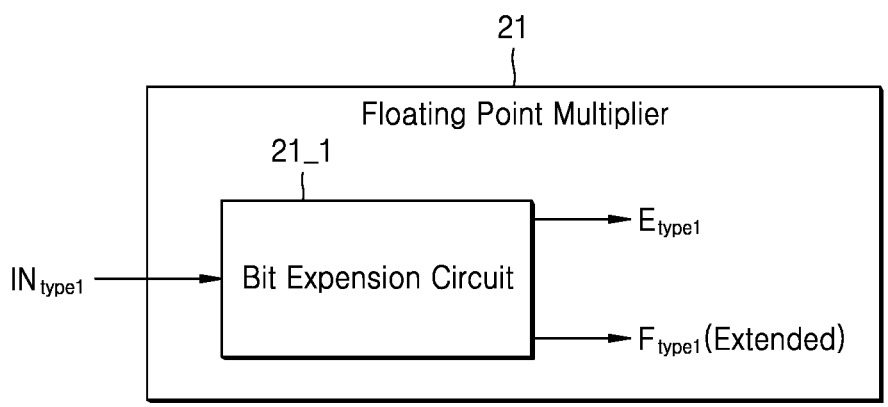
FIGS. 9A and 9B show a floating point multiplier that performs bit extension according to the type of the format of floating point data.
Figure 9B:
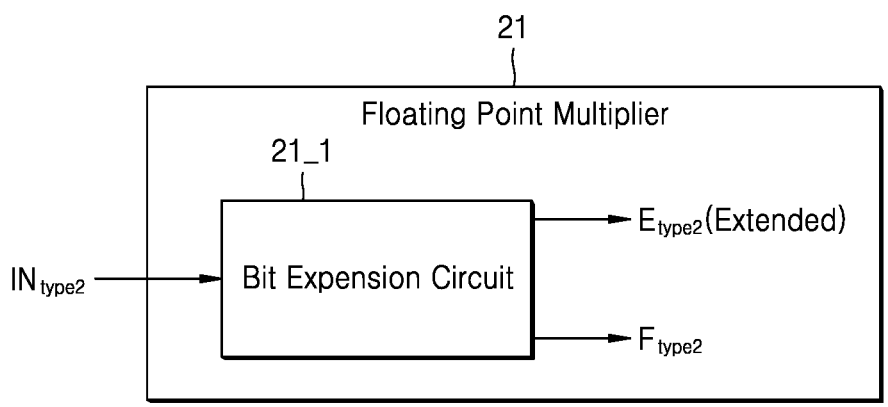

FIGS. 9A and 9B illustrate the floating point multiplier 21 that performs bit extension based on the format type of the floating point data.

Referring to FIG. 9A, in an embodiment, the floating point multiplier 21 includes a bit extension circuit 21_1. In an embodiment, the bit extension circuit 21_1 extends at least one of an exponent bit field and a fraction bit field that are included in floating point data, based on the format type of the floating point data. For example, the bit extension circuit 21_1 receives floating point data $IN_{type1}$ of a first type, outputs an exponent $E_{type1}$ of the floating point data $IN_{type1}$ as it is, and extends the bit field of a fraction $F_{type1}$ of the floating point data $IN_{type1}$ to an agreed first bit width. The agreed first bit width may be related to at least one of a bit width of a fraction $F_{type2}$ of floating point data $IN_{type2}$ of a second type, a bit width of the floating point multiplier 21 of FIGS. 8A to 8C, the number of bits in the output data of a calculation circuit, or the format type of the output data.

Referring to FIG. 9B, in an embodiment, the bit extension circuit 21_1 receives the floating point data $IN_{type2}$ of the second type, extends the bit field of an exponent $E_{type2}$ of the floating point data $IN_{type2}$ to an agreed second bit width, and outputs the fraction $F_{type2}$ of the floating point data $IN_{type2}$ as it is. The agreed second bit width may be related to a bit width of the exponent $E_{type1}$ of the floating point data $IN_{type1}$ of the first type.

For example, in an embodiment, when the first type is BF16 and the second type is FP16, the first bit width is agreed to be 11 bits, the sum of the one sign bit and the 10 bits that correspond to the bit width of the FP16 fraction $F_{type2}$, according to the bit width of the FP16 fraction $F_{type2}$. In other words, the fraction $F_{type1}$ of the BF16 format floating point data $IN_{type1}$ is extended to correspond to the bit width of the fraction $F_{type2}$ of the FP16 format floating point data $IN_{type2}$, and then undergoes a multiplication operation.

For example, in an embodiment, the second bit width is agreed to be 8 bits, based on the bit width of the BF16 exponent $E_{type1}$. In other words, the exponent $E_{type2}$ of the FP16 format floating point data $IN_{type2}$ is extended to correspond to the bit width of the exponent $E_{type1}$ of the BF16 format floating point data $IN_{type1}$, and then undergoes an addition operation.

FIGS. 10 through 15 illustrate operations of calculation circuits 20a, 20b, 20c, 20d, 20e, and 20f, according to an embodiment.

Figure 10:
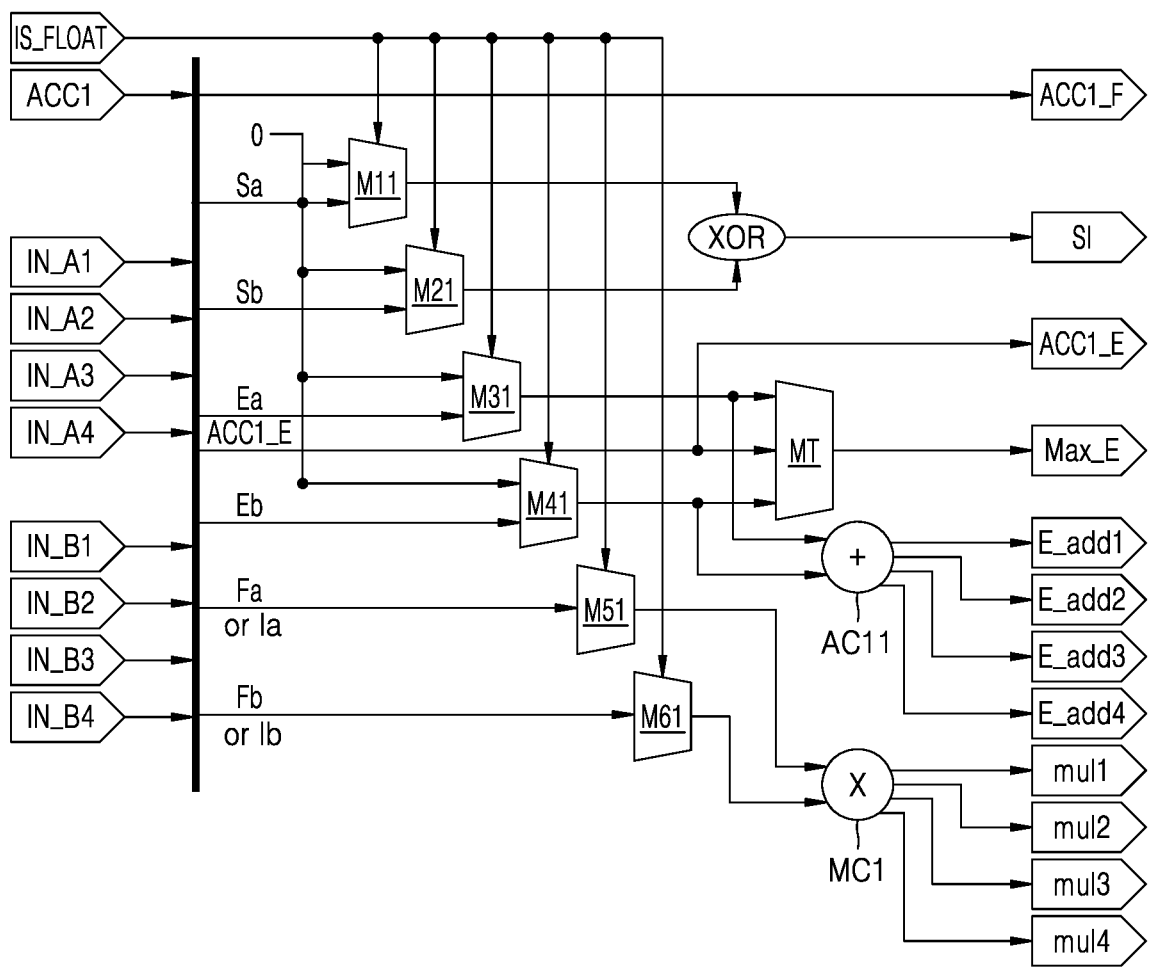
FIGS. 10 through 12, 13A, 13B, 14, and 15 illustrate operations of calculation circuits, according to an embodiment.

Referring to FIG. 10, in an embodiment, the calculation circuit 20a includes first through sixth multiplexers M11 through M61, an XOR circuit XOR, a max tree circuit MT, a first add circuit AC11, and a first multiplier circuit MC1.

First, a floating point calculation mode of the calculation circuit 20a will be described.

In an embodiment, the calculation circuit 20a receives the first through eighth input data IN_A1, IN_B1, IN_A2, IN_B2, IN_A3, IN_B3, IN_A4, and IN_B4 that are floating point data and the first cumulative data ACC1. The first multiplexer M11 sequentially outputs respective signs Sa of the first, third, fifth, and seventh data IN_A1, IN_A2, IN_A3, and IN_A4 to the XOR circuit XOR. The second multiplexer M21 sequentially outputs respective signs Sb of the second, fourth, sixth, and eighth data IN_B1, IN_B2, IN_B3, and IN_B4 to the XOR circuit XOR. The XOR circuit XOR performs an XOR operation on the signs Sa and Sb and generates the sign information SI.

In an embodiment, the third multiplexer M31 sequentially outputs respective first exponents Ea of the first, third, fifth, and seventh data IN_A1, IN_A2, IN_A3, and IN_A4 to each of the max tree circuit MT and the first add circuit AC11. The fourth multiplexer M41 sequentially outputs respective second exponents Eb of the second, fourth, sixth, and eighth data IN_B1, IN_B2, IN_B3, and IN_B4 to each of the max tree circuit MT and the first add circuit AC11.

In an embodiment, the max tree circuit MT receives a third exponent ACC1_E of the first cumulative data ACC1 and the first and second exponents Ea and Eb and identifies and outputs a maximum value Max_E for an align shift. In an embodiment, the max tree circuit MT performs an addition operation on each pair of first and second exponents Ea and Eb of the first and second exponents Ea and Eb, compares the exponent addition results and the third exponent ACC1_E with each other, and outputs the largest exponent value as the maximum value Max_E.

In an embodiment, the first add circuit AC11 outputs first through fourth exponent addition results E_add1 through E_add4 by performing an addition operation on each pair of first and second exponents Ea and Eb of the first and second exponents Ea and Eb.

In an embodiment, the fifth multiplexer M51 sequentially outputs respective first fractions Fa of the first, third, fifth, and seventh floating point data IN_A1, IN_A2, IN_A3, and IN_A4 to the first multiplier circuit MC1. The sixth multiplexer M61 sequentially outputs respective second fractions Fb of the second, fourth, sixth, and eighth floating point data IN_B1, IN_B2, IN_B3, and IN_B4 to the first multiplier circuit MC1.

In an embodiment, the first multiplier circuit MC1 outputs the first through fourth fraction multiplication results mul1 through mul4 by performing a multiplication operation on each pair of first and second fractions Fa and Fb of the first and second fractions Fa and Fb.

Hereinafter, an integer calculation mode of the calculation circuit 20a will be described.

In an embodiment, the first through sixth multiplexers M11 and M61 output "0" in response to a signal IS_FLOAT when the calculation circuit 20a operates in integer calculation mode. Because of the "0" output from the first through fourth multiplexers M11 and M41, elements for a floating point calculation in the calculation circuit 20a are deactivated.

In an embodiment, the calculation circuit 20a receives the first through fourth input data IN_A1, IN_B1, IN_A2, and IN_B2 that are integer data. Further, each of the first through fourth input data IN_A1, IN_B1, IN_A2, and IN_B2 include a pair of integer data. The fifth multiplexer M51 sequentially outputs respective first integer data Ia included in the first and third input data IN_A1 and IN_A2 to the first multiplier circuit MC1. The sixth multiplexer M61 may sequentially output respective second integer data Ib included in the second and fourth input data IN_B1 and IN_B2 to the first multiplier circuit MC1. Meanwhile, the fifth through eighth data IN_A3, IN_B3, IN_A4, and IN_B4 are input to the calculation circuit 20b that will be described below.

In an embodiment, the first multiplier circuit MC1 outputs the first through fourth integer multiplication results mul1 through mul4 by performing a multiplication operation on each pair of the first and second integer data Ia and Ib of the first and second integer data Ia and Ib.

Figure 11:
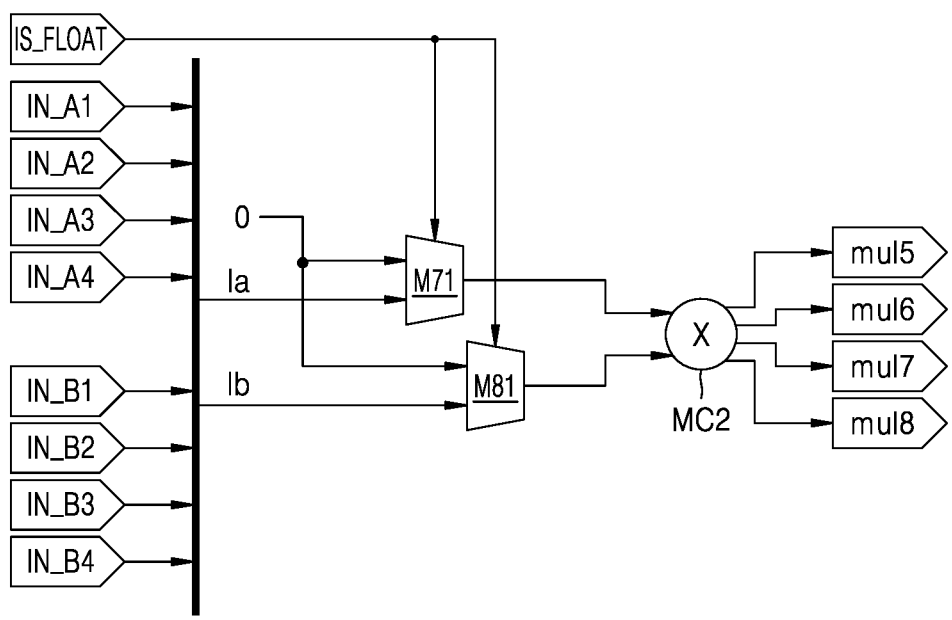

Referring to FIG. 11, in an embodiment, the calculation circuit 20b includes seventh and eighth multiplexers M71 and M81 and a second multiplier circuit MC2. The seventh and eighth multiplexers M71 and M81 and the second multiplier circuit MC2 are used in integer calculation mode.

In an embodiment, the calculation circuit 20b includes the fifth through eighth input data IN_A3, IN_B3, IN_A4, and IN_B4. Each of the fifth through eighth input data IN_A3, IN_B3, IN_A4, and IN_B4 includes a pair of integer data. The seventh multiplexer M71 sequentially outputs respective third integer data Ia included in the fifth and seventh input data IN_A3 and IN_A4 to the second multiplier circuit MC2. The eighth multiplexer M81 sequentially outputs respective fourth integer data Ib included in the sixth and eighth input data IN_B3 and IN_B4 to the second multiplier circuit MC2.

In an embodiment, the second multiplier circuit MC2 outputs the fifth through eight integer multiplication results mul5 through mul8 by performing a multiplication operation on each pair of the third and fourth integer data Ia and Ib of the third and fourth integer data Ia and Ib.

Figure 12:
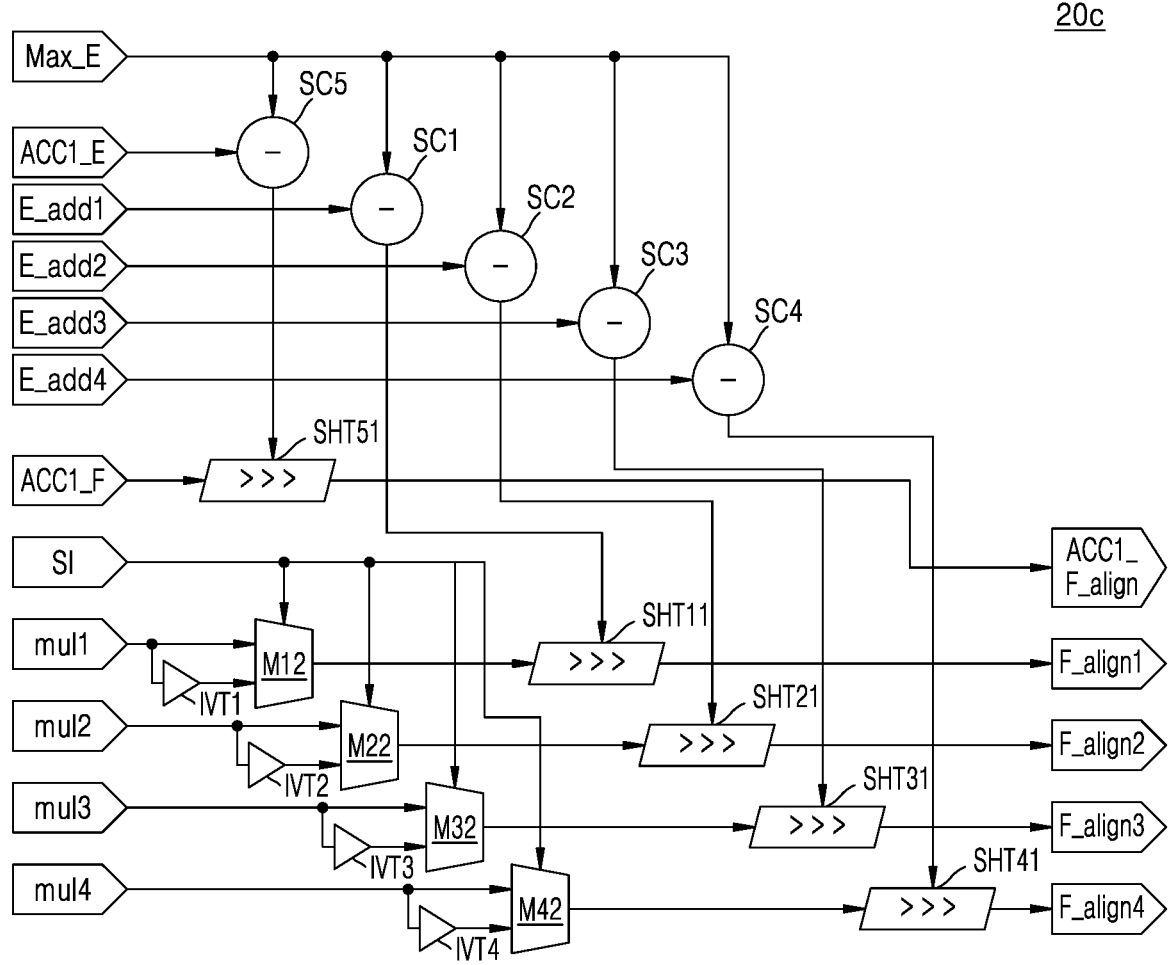

Referring further to FIG. 12, in an embodiment, the calculation circuit 20c includes first through fourth inverters IVT1 through IVT4, ninth through twelfth multiplexers M12 through M42, first through fifth shift circuits SHT11 through SHT51, and first through fifth subtractor circuits SC1 through SC5. The first through fourth inverters IVT1 through IVT4, the ninth through twelfth multiplexers M12 through M42, the first through fifth shift circuits SHT11 through SHT51, and the first through fifth subtractor circuits SC1 through SC5 are used in floating point calculation mode, and are deactivated in integer calculation mode.

In an embodiment, the ninth multiplexer M12 receives the first fraction multiplication result mul1 and a first inverted fraction multiplication result that is received from the first inverter IVT1. The tenth multiplexer M22 receives the second fraction multiplication result mul2 and a second inverted fraction multiplication result that is received from the second inverter IVT2. The eleventh multiplexer M32 receives the third fraction multiplication result mul3 and a third inverted fraction multiplication result that is received from the third inverter IVT3. The twelfth multiplexer M42 receives the fourth fraction multiplication result mul4 and a fourth inverted fraction multiplication result that is received from the fourth inverter IVT4.

In an embodiment, each of the ninth through twelfth multiplexers M12 through M42 outputs a non-inverted fraction multiplication result or an inverted fraction multiplication result in response to a corresponding sign in the sign information SI. For example, the ninth multiplexer M12 outputs the first fraction multiplication result mul1 when the first fraction multiplication result mul1 is a positive number and output the first inverted fraction multiplication result when the first fraction multiplication result mul1 is a negative number.

In an embodiment, the first subtractor circuit SC1 performs a subtraction operation on the maximum value Max_E and the first exponent addition result E_add1 and outputs a first subtraction result to the first shift circuit SHT11. The first shift circuit SHT11 outputs the first aligned fraction multiplication result F_align1 by shifting the output of the ninth multiplexer M12 in a direction that corresponds to the sign of the first subtraction result by the number of bits that corresponds to the first subtraction result.

In an embodiment, the second subtractor circuit SC2 performs a subtraction operation on the maximum value Max_E and the second exponent addition result E_add2 and outputs a second subtraction result to the second shift circuit SHT21. The second shift circuit SHT21 outputs the second aligned fraction multiplication result F_align2 by shifting the output of the tenth multiplexer M22 in a direction that corresponds to the sign of the second subtraction result by the number of bits that corresponds to the second subtraction result.

In an embodiment, the third subtractor circuit SC3 performs a subtraction operation on the maximum value Max_E and the third exponent addition result E_add3 and outputs a third subtraction result to the third shift circuit SHT31. The third shift circuit SHT31 outputs the third aligned fraction multiplication result F_align3 by shifting the output of the eleventh multiplexer M32 in a direction that corresponds to the sign of the third subtraction result by the number of bits that corresponds to the third subtraction result.

In an embodiment, the fourth subtractor circuit SC4 performs a subtraction operation on the maximum value Max_E and the fourth exponent addition result E_add4 and outputs a fourth subtraction result to the fourth shift circuit SHT41. The fourth shift circuit SHT41 outputs the fourth aligned fraction multiplication result F_align4 by shifting the output of the twelfth multiplexer M42 in a direction that corresponds to the sign of the first subtraction result by the number of bits that corresponds to the fourth subtraction result.

In an embodiment, the fifth subtractor circuit SC5 performs a subtraction operation on the maximum value Max_E and the third exponent ACC1_E of the first cumulative data ACC1 and outputs a fifth subtraction result to the fifth shift circuit SHT51. The fifth shift circuit SHT51 outputs the aligned fraction ACC1_F_align by shifting the fraction ACC1_F of the first cumulative data ACC1 in a direction that corresponds to the sign of the fifth subtraction result by the number of bits that corresponds to the fifth subtraction result.

In an embodiment, a maximum shift mount of the first through fifth shift circuits SHT11 through SHT51 is limited so as not to influence an operation accuracy required by a neural network device so that the size and power consumption of a shift circuit may be reduced.

Meanwhile, the first through fourth integer multiplication result mul1 to mul4 described with reference to FIG. 10 bypass the elements of the calculation circuit 20c when the calculation circuit 20c operates in integer calculation mode.

Figure 13A:
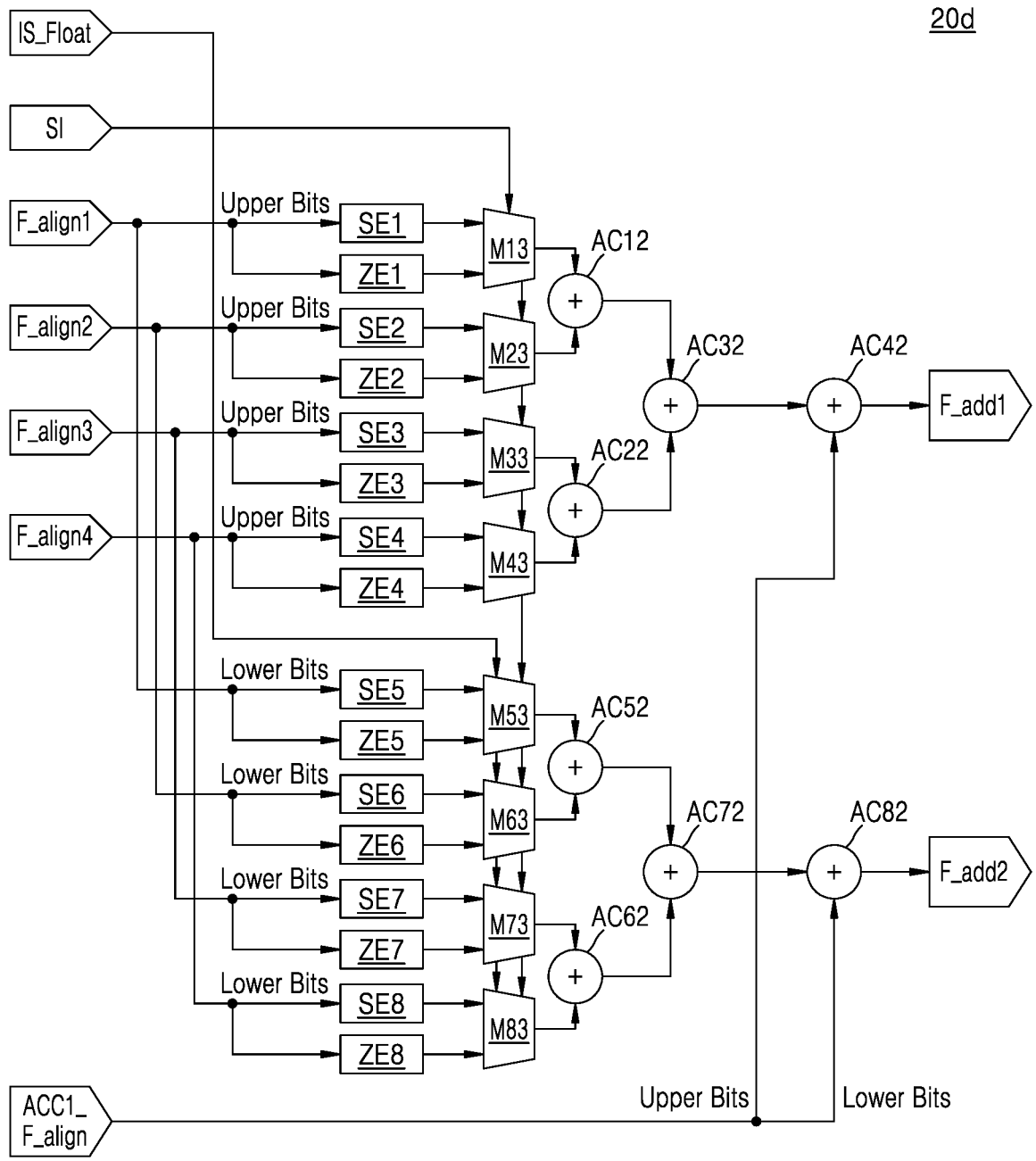

Referring further to FIG. 13A, in an embodiment, the calculation circuit 20d includes first through eighth sign extension circuits SE1 through SE8, first through eighth zero extension circuit ZE1 through ZE8, thirteenth through twentieth multiplexers M13 through M83, and second through ninth add circuits AC12 to AC82. Hereinafter, the floating point calculation mode of the calculation circuit 20d will be described, and for convenience of description, the first through fourth aligned fraction multiplication results F_align1 through F_align4 are referred to as first through fourth fraction multiplication results F_align1 through F_align4.

In an embodiment, the thirteenth multiplexer M13 receives first extended upper bits of the first fraction multiplication result F_align1 from a first sign extension circuit SE1 and second extended upper bits of the first fraction multiplication result F_align1 from a first zero extension circuit ZE1. The first sign extension circuit SE1 generates the first extended upper bits of the first fraction multiplication result F_align1 by copying a sign to extension bits appended to the upper bits of the first fraction multiplication result F_align1 such that the extension bits are filled with 1s. The first zero extension circuit ZE1 generates the second extended upper bits of the first fraction multiplication result F_align1 by filling extension bits appended to the upper bits of the first fraction multiplication result F_align1 with 0s.

As described above, in an embodiment, each of the fourteenth through sixteenth multiplexers M23 through M43 receives first extended upper bits and second extended upper bits of a corresponding second through fourth fraction multiplication result F_align2 through F_align4, where the first extended upper bits include extension bits filled with 1s by copying a sign to the extension bits by using a corresponding second through fourth sign extension circuit SE2 through SE4, and the second extended upper bits include extension bits filled with 0s by using a corresponding second through fourth zero extension circuit ZE2 through ZE4.

In an embodiment, seventeenth multiplexer M53 receives first extended lower bits of the first fraction multiplication result F_align1 from a fifth sign extension circuit SE5 and second extended lower bits of the first fraction multiplication result F_align1 from a fifth zero extension circuit ZE5. The fifth sign extension circuit SE5 generates the first extended lower bits of the first fraction multiplication result F_align1 by copying a sign to extension bits appended to the lower bits of the first fraction multiplication result F_align1 such that the extension bits are filled with 1s. The fifth zero extension circuit ZE5 generates the second extended lower bits of the first fraction multiplication result F_align1 by filling extension bits appended to the lower bits of the first fraction multiplication result F_align1 with 0s.

As described above, in an embodiment, each of the eighteenth through twentieth multiplexers M63 through M83 receives first extended lower bits and second extended lower bits of a corresponding second through fourth fraction multiplication result F_align2 through F_align4, where the first extended lower bits include extension bits filled with 1s by copying a sign to the extension bits using a corresponding sixth through eighth sign extension circuit SE6 through SE8, and the second extended lower bits include extension bits filled with 0s using a corresponding sixth through eighth zero extension circuit ZE6 through ZE8.

In an embodiment, in a floating point calculation mode, i.e., when IS_FLOAT=1, each of the thirteenth through sixteenth multiplexers M13 through M43 outputs the first extended upper bits that are received from a corresponding first through fourth sign extension circuits SE1 through SE4 in response to a corresponding sign in the sign information SI. In floating point calculation mode, i.e., when IS_FLOAT=1, each of the seventeenths through twentieth multiplexers M53 through M83 outputs the second extended lower bits that are received from a corresponding fifth through eighth zero extension circuits ZE5 through ZE8.

In an embodiment, the second add circuit AC12 adds an output of the thirteenth multiplexer M13 to an output of the fourteenth multiplexer M23. The third add circuit AC22 adds an output of the fifteenth multiplexer M33 to an output of the sixteenth multiplexer M43. The fourth add circuit AC32 adds an output of the second add circuit AC12 to an output of the third add circuit AC22. The fifth add circuit AC42 generates the first addition result data F_add1 by adding an output of the fourth add circuit AC32 to the upper bits of the aligned fraction ACC1_F_align. In addition, the upper bits of the aligned fraction ACC1_F align that are input to the fifth add circuit AC42 correspond to sign extended data.

In an embodiment, the sixth add circuit AC52 adds an output of the seventeenth multiplexer M53 to an output of the eighteenth multiplexer M63. The seventh add circuit AC62 adds an output of the nineteenth multiplexer M73 to an output of the twentieth multiplexer M83. The eighth add circuit AC72 adds an output of the sixth add circuit AC52 to an output of the seventh add circuit AC62. The ninth add circuit AC82 generates the second addition result data F_add2 by adding an output of the eighth add circuit AC72 to the lower bits of the aligned fraction ACC1_F align. In addition, the lower bits of the aligned fraction ACC1_F_align that are input to the ninth add circuit AC82 correspond to zero extended data.

Figure 13B:
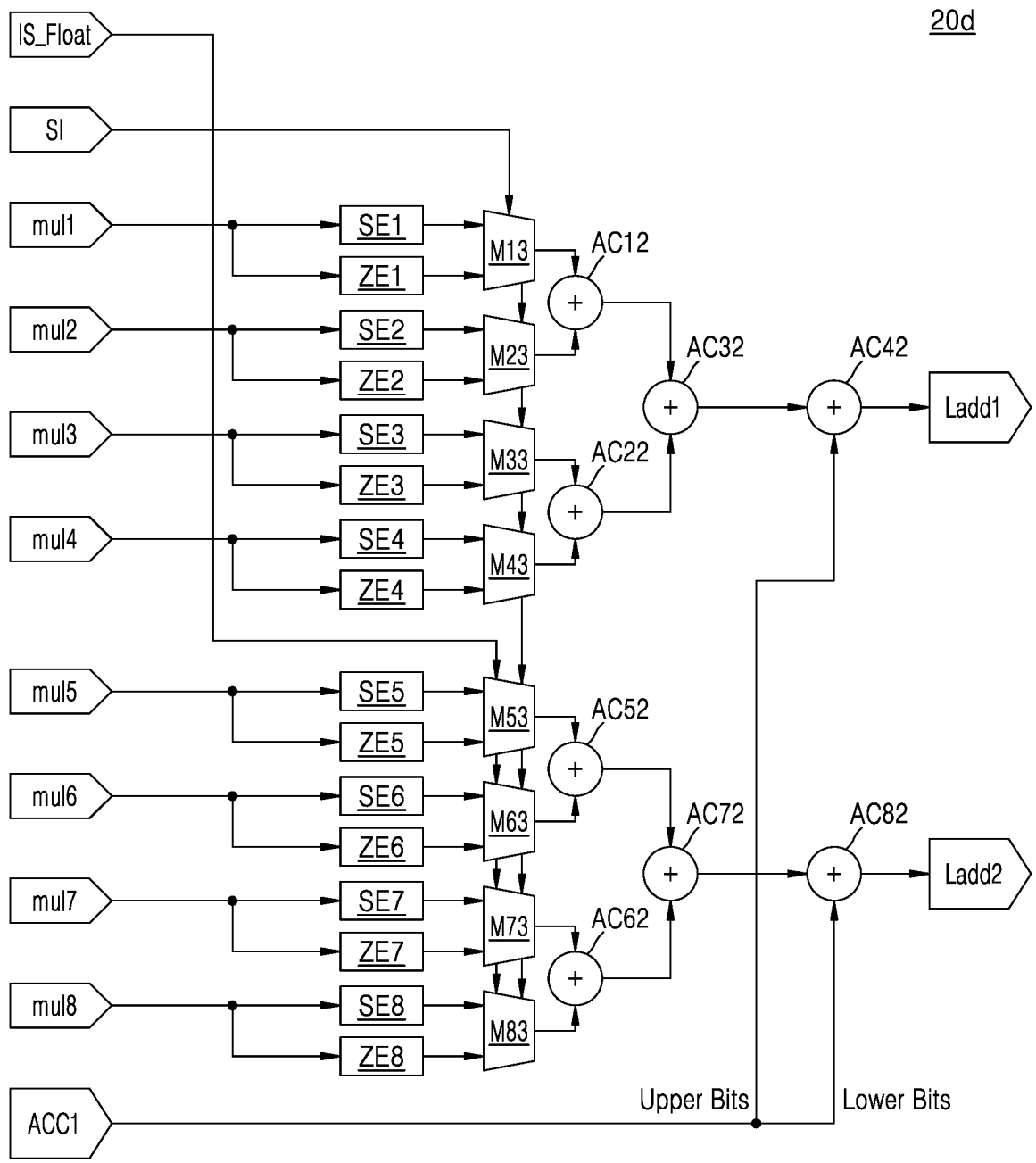

Referring further to FIG. 13B, in an embodiment, when the calculation circuit 20*d* operates in integer calculation mode, the first through fourth integer multiplication result mul1 to mul4 described with reference to FIG. 10 bypass the elements of the calculation circuit 20*c* and are respectively input to the first through fourth sign extension circuits SE1 to SE4 and the first through fourth zero extension circuits ZE1 to ZE4.

Accordingly, in an embodiment, the thirteenth multiplexer M13 receives first extended bits of the first integer multiplication result mul1 from the first sign extension circuit SE1 and second extended bits of the first integer multiplication result mul1 from the first zero extension circuit ZE1. The first sign extension circuit SE1 generates the first extended bits of the first integer multiplication result mul1 by copying a sign to extension bits appended to the bits of the first integer multiplication result mul1 such that the extension bits are filled with 1s. The first zero extension circuit ZE1 generates the second extended bits of the first integer multiplication result mul1 by filling extension bits appended to the bits of the first integer multiplication result mul1 with 0s.

As described above, in an embodiment, each of the fourteenth through sixteenth multiplexers M23 through M43 receives first extended bits and second extended bits of a corresponding second through fourth integer multiplication result mul2 to mul4, where the first extended bits include extension bits filled with 1s by copying a sign to the extension bits using a corresponding second through fourth sign extension circuit SE2 through SE4, and the second extended bits include extension bits filled with 0s by using a corresponding second through fourth zero extension circuit ZE2 through ZE4.

Further, in an embodiment, the fifth through eighth integer multiplication results mul5 to mul8 described with reference to FIG. 11 are respectively input to the fifth through eighth sign extension circuits SE5 to SE8 and the fifth through eighth zero extension circuits ZE5 to ZE8.

Accordingly, in an embodiment, the seventeenth multiplexer M53 receives first extended bits of the fifth integer multiplication result mul5 from the fifth sign extension circuit SE5 and second extended bits of the fifth integer multiplication result mul5 from the fifth zero extension circuit ZE5. The fifth sign extension circuit SE5 generates the first extended bits of the fifth integer multiplication result mul5 by copying a sign to extension bits appended to the bits of the fifth integer multiplication result mul5 such that the extension bits are filled with 1s. The fifth zero extension circuit ZE5 generates the second extended bits of the fifth integer multiplication result mul5 by filling extension bits appended to the bits of the fifth integer multiplication result mul5 with 0s.

As described above, In an embodiment, each of the eighteenth through twentieth multiplexers M63 through M83 receives first extended bits and second extended bits of a corresponding sixth through eighth integer multiplication result mul6 to mul8, where the first extended bits include extension bits filled with 1s by copying a sign to the extension bits using a corresponding sixth through eighth sign extension circuit SE6 through SE8, and the second extended bits include extension bits filled with 0s by using a corresponding sixth through eighth zero extension circuit ZE6 through ZE8.

In some embodiments, in integer calculation mode, i.e., when IS_FLOAT=0, each of the thirteenth through sixteenth multiplexers M13 through M43 outputs the first extended bits that are received from a corresponding first through fourth sign extension circuit SE1 through SE4, or the second extended bits that are received from a corresponding first through fourth zero extension circuit ZE1 through ZE4, based on a corresponding sign of the input integer multiplication result. In integer calculation mode, i.e., when IS_FLOAT=0, each of the seventeenth through twentieth multiplexers M53 through M83 outputs the first extended bits that are received from a corresponding fifth through eighth sign extension circuit SE5 through SE8, or the second extended bits that are received from a corresponding fifth through eighth zero extension circuit ZE5 through ZE8, in response to a corresponding sign of the input integer multiplication result.

In an embodiment, the second add circuit AC12 adds an output of the thirteenth multiplexer M13 to an output of the fourteenth multiplexer M23. The third add circuit AC22 adds an output of the fifteenth multiplexer M33 to an output of the sixteenth multiplexer M43. The fourth add circuit AC32 adds an output of the second add circuit AC12 to an output of the third add circuit AC22. The fifth add circuit AC42 generates first addition result data I_add1 by adding an output of the fourth add circuit AC32 to the upper bits of the first cumulative data ACC1.

In an embodiment, the sixth add circuit AC52 adds an output of the seventeenth multiplexer M53 to an output of the eighteenth multiplexer M63. The seventh add circuit AC62 adds an output of the nineteenth multiplexer M73 to an output of the twentieth multiplexer M83. The eighth add circuit AC72 adds an output of the sixth add circuit AC52 to an output of the seventh add circuit AC62. The nineteenth add circuit AC82 generates second addition result data I_add2 by adding an output of the eighth add circuit AC72 to the lower bits of the first cumulative data ACC1.

Figure 14:
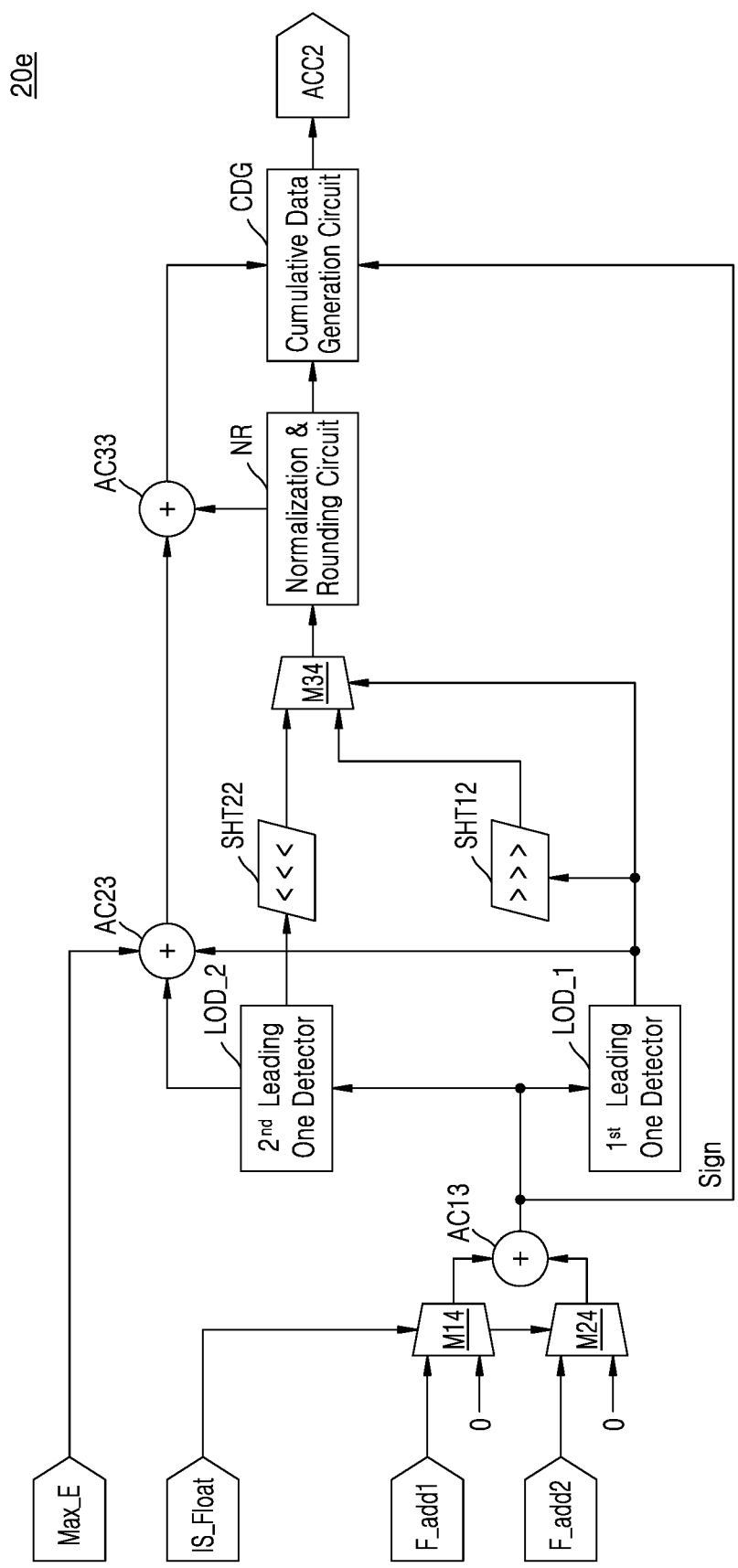

Referring further to FIG. 14, in an embodiment, the calculation circuit 20*e* includes twenty-first through twenty-third multiplexers M14 through M34, tenth through twelfth add circuits AC13 to AC33, first and second leading one detectors LOD_1 and LOD_2, sixth and seventh shift circuits SHT12 and SHT22, a normalization and rounding circuit NR, and a cumulative data generation circuit CDG. The twenty-first through twenty-third multiplexers M14 through M34, the tenth through twelfth add circuits AC13 to AC33, the first and second leading one detectors LOD_1 and LOD_2, the sixth and seventh shift circuits SHT12 and SHT22, the normalization and rounding circuit NR, and the cumulative data generation circuit CDG are used in floating point calculation mode and are deactivated in integer calculation mode.

Specifically, in an embodiment, the twenty-first and the twenty-second multiplexers M14 and M24 output "0" in response to the signal IS_FLOAT when the calculation circuit 20*e* operates in integer calculation mode. Because of the "0" output from the twenty-first and the twenty-second multiplexers M14 and M24, elements for a floating point calculation in the calculation circuit 20e are deactivated. Hereinafter, the floating point calculation mode of the calculation circuit 20e will be described.

In an embodiment, the twenty-first multiplexer M14 outputs the first addition result data F_add1 to the tenth add circuit AC13. The twenty-second multiplexer M24 outputs the second addition result data F_add2 to the tenth add circuit AC23.

In an embodiment, the tenth add circuit AC13 generates third addition result data by adding the first addition result data F_add1 to the second addition result data F_add2. In this regard, the first addition result data F_add1 is shifted by the number of lower bits and then added. The number of lower bits is the same as the number of lower bits of the fraction multiplication result of FIG. 13A. The first leading one detector LOD_1 performs first leading one detection on the "k" upper bits of the third addition result data that include the MSB, from which at least one bit that represents a sign is removed, where "k" is an integer of at least 1. The second leading one detector LOD_2 performs second leading one detection on the "n" lower bits of the third addition result data that include the LSB, from which the k upper bits are removed, where "n" is an integer of at least 1. The first and second leading one detectors LOD_1 and LOD_2 perform in parallel. For example, "k" may be less than "n". The at least one bit that represents the sign of the third addition result data is output to the cumulative data generation circuit CDG.

In an embodiment, the sixth shift circuit SHT12 shifts the third addition result data received from the first leading one detector LOD_1 in a first direction. The seventh shift circuit SHT22 shifts the third addition result data received from the second leading one detector LOD_2, in a second direction. For example, the first direction may be opposite to the second direction. The first direction may be a right direction, i.e., a direction in which a point is located with respect to an exponent and a size decreases through a shift, and the second direction may be a left direction, i.e., a direction in which a point is located with respect to a fraction and a size increases through a shift.

In an embodiment, the eleventh add circuit AC23 receives the maximum value Max_E and shift information from the detection results of the first and second leading one detectors LOD_1 and LOD_2, and adds the maximum value Max_E to the shift information. The shift information indicates the position of "1" detected in the third addition result data and is generated by one of the first and second leading one detectors LOD_1 and LOD_2.

In an embodiment, the twenty-second multiplexer M34 provides an output that corresponds to a leading one detector that has detected "1" among respective outputs of the sixth and seventh shift circuits SHT12 and SHT22 to the normalization and rounding circuit NR.

In an embodiment, the normalization and rounding circuit NR perform normalization and rounding on the third addition result data that has been shifted by the sixth or seventh shift circuit SHT12 or SHT22, and outputs exponent update information to the twelfth add circuit AC33.

In an embodiment, the twelfth add circuit AC33 adds the exponent update information to an output of the eleventh add circuit AC23 and outputs an addition result to the cumulative data generation circuit CDG.

In an embodiment, the cumulative data generation circuit CDG generates the second cumulative data ACC2 using the sign of the third addition result data, an output of the normalization and rounding circuit NR, and an output of the twelfth add circuit AC33.

Figure 15:
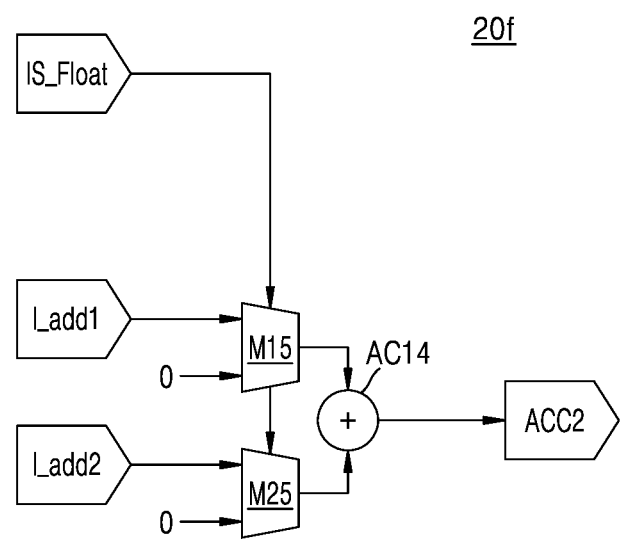

Referring further to FIG. 15, in an embodiment, the calculation circuit 20f includes twenty-fourth and twenty-fifth multiplexers M15 and M25, and a thirteenth add circuit AC14. The twenty-fourth and twenty-fifth multiplexers M15 and M25 and the thirteenth add circuit AC14 are used in integer calculation mode and are deactivated in floating point calculation mode.

Specifically, in an embodiment, the twenty-fourth and twenty-fifth multiplexers M15 and M25 output "0" in response to the signal IS_FLOAT when the calculation circuit 20f operates in floating point calculation mode. Hereinafter, the integer calculation mode of the calculation circuit 20f will be described.

In an embodiment, the twenty-fourth multiplexer M15 outputs the first addition result data F_add1 to the thirteenth add circuit AC14. The twenty-fifth multiplexer M25 outputs the second addition result data F_add2 to the thirteenth add circuit AC14. The thirteenth add circuit AC14 generates the second cumulative data ACC2 by adding the outputs of the twenty-fourth and twenty-fifth multiplexers M15 and M25.

Figure 16:
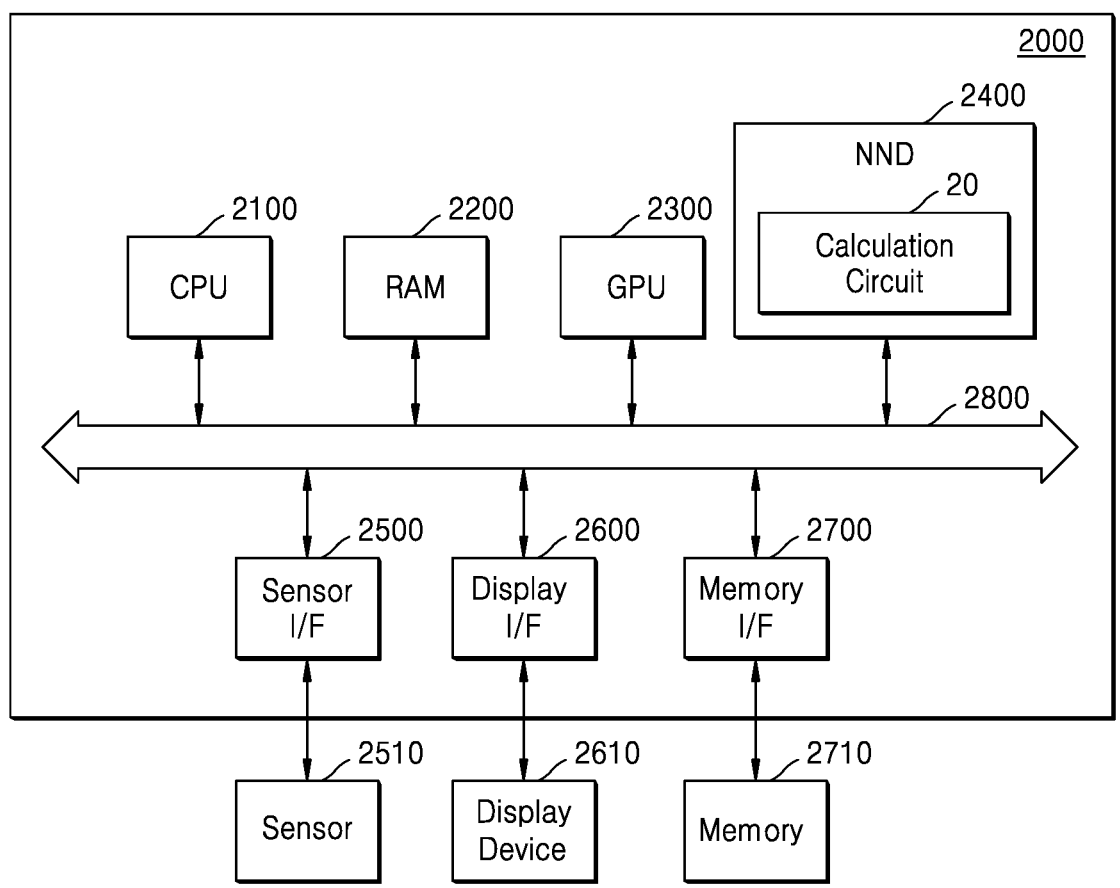
FIG. 16 is a block diagram of an application processor according to an embodiment.

FIG. 16 is a block diagram of an application processor 2000 according to an embodiment.

Referring to FIG. 16, in an embodiment, the application processor 2000 includes a CPU 2100, RAM 2200, a GPU 2300, a neural network device 2400, a sensor interface 2500, a display interface 2600, and a memory interface 2700. The application processor 2000 further includes a communication module. The elements, i.e., the CPU 2100, the RAM 2200, the GPU 2300, the neural network device 2400, the sensor interface 2500, the display interface 2600, and the memory interface 2700, of the application processor 2000 exchange data with each other through a bus 2800.

In an embodiment, the CPU 2100 generally controls operations of the application processor 2000. The CPU 2100 may include a single core or multiple cores. The CPU 2100 processes or executes programs or data that are stored in a memory 2710. In an embodiment, the CPU 2100 controls the functions of the neural network device 2400 by executing programs stored in the memory 2710.

In an embodiment, the RAM 2200 temporarily stores programs, data, or instructions. In an embodiment, the RAM 2200 may include a DRAM or an SRAM. The RAM 2200 can temporarily store an image that is input or output through the interfaces, such as the sensor interface 2500 or the display interface 2600, or generated by the GPU 2300 or the CPU 2100.

In an embodiment, the application processor 2000 further includes a ROM. The ROM stores programs or data that are continuously used. The ROM may include an EPROM or an EEPROM.

In an embodiment, the GPU 2300 performs image processing on image data. For example, the GPU 2300 can perform image processing on image data that is received through the sensor interface 2500. In an embodiment, the GPU 2300 performs a floating point calculation.

In an embodiment, the image data processed by the GPU 2300 may be stored in the memory 2710 or output to a display device 2610 through the display interface 2600. The image data stored in the memory 2710 may be output to the neural network device 2400.

In an embodiment, the sensor interface 2500 interfaces with data, such as image data, audio data, etc, received from a sensor 2510 connected to the application processor 2000.

In an embodiment, the display interface 2600 interfaces with data, such as an image, output to the display device 2610. The display device 2610 outputs an image or data about the image through a display such as a liquid crystal display (LCD) or an active matrix organic light-emitting diode (AMOLED) display.

In an embodiment, the memory interface 2700 interfaces with data received from the memory 2710 outside the application processor 2000 or data output to the memory 2710. In an embodiment, the memory 2710 includes volatile memory such as DRAM or SRAM or non-volatile memory such as RRAM, PRAM, or NAND flash memory. The memory 2710 may include a memory card such as a multimedia card (MMC), an embedded MMC (eMMC), an SD card, or a micro-SD card.

In an embodiment, the neural network device 2400 includes the calculation circuits 20, 20a, and 20b that perform the floating point calculations and the integer calculations described above with reference to FIGS. 1 through 15. The calculation circuits 20, 20a, and 20b perform dot product operations and accumulation operations on floating point data items and integer data items that have various format types and include a floating point multiplier for floating point multiplication operations and an integer multiplier for integer multiplication operations, where the floating point multiplier and the integer multiplier can share at least one multiplier, thereby reducing power consumption and design area of a neural network device. Specific embodiments of the calculation circuits 20, 20a, and 20b are described above and are thus omitted below.

While embodiments of the inventive concept has been particularly shown and described with reference to disclosed embodiments thereof, it will be understood that various changes in form and details may be made therein without departing from the spirit and scope of the following claims.

What is claimed is:

1. A neural network device, the neural network device comprising:
   a calculation circuit that includes a first multiplier, a second multiplier, an align shifter, an adder, and a first post adder,
   wherein the adder shares the first multiplier and the second multiplier,
   wherein the calculation circuit performs a first dot product operation on a plurality of floating point data pairs or a second dot product operation on a plurality of integer data pairs,
   wherein in the first dot product operation, the calculation circuit
   obtains a plurality of fraction multiplication results from the plurality of floating point data pairs, respectively, using the first multiplier,
   performs an align shift of the plurality of fraction multiplication results based on a maximum value identified from a plurality of exponent addition results that respectively correspond to the plurality of floating point data pairs using the align shifter,
   adds the aligned plurality of fraction multiplication results and generates first cumulative data using the adder,
   detects a first leading one by right shifting upper bits of the first cumulative data using the first post adder,
   detects a second leading one by right shifting lower bits of the first cumulative data that exclude the upper bits of the first cumulative data using the first post adder, and
   outputs the first cumulative data using the first post adder, and,
   wherein in the second dot product operation, the calculation circuit
   obtains a plurality of integer multiplication results from the plurality of integer data pairs, respectively, using the second multiplier,
   adds the plurality of integer multiplication results using the adder and
   outputs second cumulative data,
   wherein the adder comprises:
   a first add circuit that adds upper bits, but not lower bits, of the aligned plurality of fraction multiplication results in the first dot product operation; and
   a second add circuit that adds lower bits, but not upper bits, of the aligned plurality of fraction multiplication results in the first dot product operation, or adds the plurality of integer multiplication results in the second dot product operation.

2. The neural network device of claim 1, wherein the calculation circuit further comprises:
   a second post adder that, in the second dot product operation, adds a first addition result data output from the second add circuit and outputs the second cumulative data,
   wherein the first post adder in the first dot product operation further
   generates third addition result data by adding addition result data output from the first add circuit to a second addition result data output from the second add circuit, and
   outputs the first cumulative data by normalizing and rounding the third addition result data.

3. The neural network device of claim 2, wherein the calculation circuit receives the plurality of integer data pairs that include first integer data pairs and second integer data pairs, and
   in the second dot product operation,
   obtains first integer multiplication results with respect to the first integer data pairs using the first multiplier, and
   obtains second integer multiplication results with respect to the second integer data pairs using the second multiplier.

4. The neural network device of claim 3,
   wherein the first add circuit adds the first integer multiplication results in the second dot product operation and
   wherein the second add circuit adds the second integer multiplication results in the second dot product operation.

5. The neural network device of claim 4, wherein, in the second dot product operation, the second post adder
   adds the addition result data output from the first add circuit to the addition result data output from the second add circuit and
   outputs the second cumulative data.

6. The neural network device of claim 2, wherein the calculation circuit
   gates the second multiplier and the second post adder when performing the first dot product operation, and
   gates the align shifter and the first post adder when performing the second dot product operation.

7. The neural network device of claim 1,
   wherein a plurality of input data items included in the plurality of floating point data pairs have different types of formats from that of the first cumulative data, and
   wherein a plurality of input data items included in the plurality of integer data pairs have different types of formats from that of the second cumulative data.

8. The neural network device of claim 7,
wherein the plurality of input data items included in the plurality of floating point data pairs have a floating point 16 (FP16)-type format or a brain float 16 (BF16)-type format, and
wherein the first cumulative data has a floating point 32 (FP32)-type format.

9. The neural network device of claim 8, wherein the calculation circuit
extends an exponent bit field of first data of the plurality of input data items that have the FP16-type format and
extends a fraction bit field of second data of the plurality of input data items that have the BF16-type format.

10. The neural network device of claim 7,
wherein the plurality of input data items in the plurality of integer data pairs have an integer8 (INT8)-type format, and
wherein the second cumulative data has an integer32 (INT32)-type format.

11. The neural network device of claim 1, further comprising:
a buffer that stores third cumulative data that is floating point data generated by the calculation circuit, and
wherein, in the first dot product operation, the calculation circuit
receives the plurality of floating point data pairs and the third cumulative data,
performs an align shift of the plurality of fraction multiplication results and a fraction part of the third cumulative data based on the maximum value identified from the plurality of exponent addition results and an exponent part of the third cumulative data,
adds the aligned plurality of fraction multiplication results and the aligned fraction part of the third cumulative data using the adder, and
outputs the first cumulative data.

12. The neural network device of claim 11,
wherein the buffer stores fourth accumulative data that is integer data generated by the calculation circuit, and
wherein, in the second dot product operation, the calculation circuit
receives the plurality of integer data pairs and the fourth cumulative data,
adds the plurality of fraction multiplication results and the fourth cumulative data using the adder, and
outputs the second cumulative data.

13. The neural network device of claim 12, wherein the calculation circuit stores the first cumulative data and the second cumulative data in the buffer.

14. The neural network device of claim 1, wherein the calculation circuit further:
detects a first value one by right shifting the upper bits of the first cumulative data for the detection of the first leading one using the first post adder, and
detects a second value one by right shifting the lower bits of the first cumulative data that exclude the upper bits of the first cumulative data for the detection of the second leading one using the first post adder.

15. A method of operating a neural network device, the operating method comprising:
configuring the neural network device to perform both floating point and integer operations;
receiving a plurality of data pairs;
performing a floating point operation when the plurality of data pairs have a floating point format;
performing an integer operation when the plurality of data pairs have an integer format; and
storing final data generated through the floating point operation or the integer operation in a memory,
wherein performing the floating point operation comprises:
obtaining a plurality of fraction multiplication results that respectively correspond to the plurality of data pairs using a floating point multiplier,
performing an align shift of the plurality of fraction multiplication results based on a maximum value identified from a plurality of exponent addition results that respectively correspond to the plurality of data pairs using an align shifter,
adding upper bits, but not lower bits, of the aligned plurality of fraction multiplication results using a first add circuit included in an adder,
adding lower bits, but not upper bits, of the aligned plurality of fraction multiplication results using a second add circuit included in the adder,
adding the plurality of fraction multiplication results using a post adder wherein first cumulative data is generated,
detecting a first leading one by right shifting upper bits of the first cumulative data using the post adder, and
detecting a second leading one by right shifting lower bits of the first cumulative data that exclude the upper bits of the first cumulative data using the post adder, and
wherein performing the integer operation comprises:
obtaining a plurality of integer multiplication results that respectively correspond to the plurality of data pairs using an integer multiplier, and
adding the plurality of integer multiplication results using the adder wherein second cumulative data is generated.

16. The method of claim 15,
wherein performing the floating point operation further comprises:
adding the aligned plurality of fraction multiplication results using the adder, and
outputting the first cumulative data,
wherein detecting the first leading one further comprises:
detecting a first value one by right shifting the upper bits of the first cumulative data using the post adder, and
wherein detecting the second leading one further comprises
detecting a second value one by right shifting the lower bits of the first cumulative data that exclude the upper bits of the first cumulative data using the post adder.

17. The method of claim 16, wherein performing the floating point operation further comprises:
adding operation results of the first add circuit and the second add circuit wherein the first cumulative data is generated.

18. The method of claim 15, wherein performing the integer operation further comprises:
obtaining first integer multiplication results that respectively correspond to first data pairs of the plurality of data pairs using the floating point multiplier and
obtaining second integer multiplication results that respectively correspond to second data pairs of the plurality of data pairs using the integer multiplier.

19. The method of claim 18, wherein performing the integer operation further comprises:
adding the first integer multiplication results using a first add circuit included in the adder, adding the second integer multiplication results using a second add circuit included in the adder, and adding operation results of the first add circuit and the second add circuit wherein the second cumulative data is generated.

20. An application processor, comprising:
a neural network device that includes a floating point multiplier, an integer multiplier, an adder, a first post adder and a memory,
wherein the neural network device performs
a first dot product operation on a plurality of floating point data pairs or
a second dot product operation on a plurality of integer data pairs, wherein,
in the first dot product operation, the neural network device
obtains a plurality of fraction multiplication results from the plurality of floating point data pairs, respectively, using the floating point multiplier,
adds the plurality of fraction multiplication results using the adder wherein first cumulative data is generated,
detects a first leading one by right shifting upper bits of the first cumulative data using the first post adder,
detects a second leading one by right shifting lower bits of the first cumulative data that exclude the upper bits of the first cumulative data using the first post adder, and
stores the first cumulative data in the memory, wherein
in the second dot product operation, the neural network device
obtains a plurality of integer multiplication results from the plurality of integer data pairs, respectively, using the floating point multiplier and the integer multiplier,
adds the plurality of integer multiplication results using the adder wherein second cumulative data is generated, and
stores the second cumulative data in the memory,
wherein the adder comprises:
a first add circuit that adds upper bits, but not lower bits, of the plurality of fraction multiplication results in the first dot product operation; and
a second add circuit that adds lower bits, but not upper bits, of the plurality of fraction multiplication results in the first dot product operation, or adds the plurality of integer multiplication results in the second dot product operation.

* * * * *